US008016903B2

(12) United States Patent
Nelson et al.

(10) Patent No.: US 8,016,903 B2
(45) Date of Patent: Sep. 13, 2011

(54) Z-FILTER MEDIA PACK ARRANGEMENT; FILTER CARTRIDGE; AIR CLEANER ARRANGEMENT; AND, METHODS

(75) Inventors: Benny Kevin Nelson, Waconia, MN (US); David W. Nelson, Coon Rapids, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 505 days.

(21) Appl. No.: 11/632,890

(22) PCT Filed: Jul. 20, 2005

(86) PCT No.: PCT/US2005/025817
§ 371 (c)(1),
(2), (4) Date: Oct. 22, 2007

(87) PCT Pub. No.: WO2006/012386
PCT Pub. Date: Feb. 2, 2006

(65) Prior Publication Data
US 2008/0110142 A1    May 15, 2008

Related U.S. Application Data

(60) Provisional application No. 60/589,428, filed on Jul. 20, 2004.

(51) Int. Cl.
*B01D 46/00* (2006.01)
(52) U.S. Cl. ............... 55/357; 55/498; 55/502; 55/521
(58) Field of Classification Search ............... 55/385, 55/385.3, 521, 522, 527, 528, 357, 486, 487, 55/498, 502; 95/273, 286; 210/233, 486
See application file for complete search history.

(56) References Cited

U.S. PATENT DOCUMENTS

| | | | |
|---|---|---|---|
| 2,599,604 | A | 6/1952 | Bauer et al. |
| 3,025,963 | A | 3/1962 | Bauer |
| 4,255,175 | A | 3/1981 | Wilkins |
| 4,394,147 | A | 7/1983 | Caddy et al. |
| 4,498,989 | A | 2/1985 | Miyakawa et al. |
| 4,678,489 | A | 7/1987 | Bertelsen |
| 4,824,564 | A | 4/1989 | Edwards et al. |
| 5,069,790 | A | 12/1991 | Mordeki |
| 5,472,463 | A | 12/1995 | Herman et al. |

(Continued)

FOREIGN PATENT DOCUMENTS

DE            962 066           4/1957

(Continued)

OTHER PUBLICATIONS

U.S. Appl. No. 60/627,674, filed Nov. 12, 2004.

(Continued)

*Primary Examiner* — Duane Smith
*Assistant Examiner* — Thomas McKenzie
(74) *Attorney, Agent, or Firm* — Merchant & Gould P.C.

(57) ABSTRACT

A filter cartridge for use in an air cleaner is provided. The filter cartridge comprises a media pack having a flow end with a framework arrangement thereon. The preferred framework arrangement comprises a frame piece that includes: a seal support; a handle arrangement; and a force transfer arrangement thereon. The seal member is positioned on the framework. An air cleaner arrangement for use with the cartridge is shown. Methods of assembly and service are described.

18 Claims, 23 Drawing Sheets

U.S. PATENT DOCUMENTS

| | | | |
|---|---|---|---|
| 5,536,290 | A | 7/1996 | Stark et al. |
| 5,601,717 | A | 2/1997 | Villette et al. |
| 5,613,992 | A | 3/1997 | Engel |
| 5,690,712 | A | 11/1997 | Engel |
| 5,820,646 | A | 10/1998 | Gillingham et al. |
| 5,895,574 | A | 4/1999 | Friedmann et al. |
| 5,902,364 | A | 5/1999 | Tokar et al. |
| 6,149,700 | A | 11/2000 | Morgan et al. |
| 6,190,432 | B1 | 2/2001 | Gieseke et al. |
| 6,235,195 | B1 * | 5/2001 | Tokar ............................ 210/238 |
| D450,827 | S | 11/2001 | Gieseke et al. |
| D450,828 | S | 11/2001 | Tokar |
| 6,348,084 | B1 | 2/2002 | Gieseke et al. |
| 6,350,291 | B1 | 2/2002 | Gieseke et al. |
| 6,368,374 | B1 | 4/2002 | Tokar et al. |
| 6,391,076 | B1 | 5/2002 | Jaroszczyk et al. |
| D461,076 | S | 7/2002 | Gieseke et al. |
| 6,416,605 | B1 | 7/2002 | Golden |
| D461,884 | S | 8/2002 | Gieseke et al. |
| D466,602 | S | 12/2002 | Gieseke et al. |
| 6,610,117 | B2 | 8/2003 | Gieseke et al. |
| 6,743,317 | B2 | 6/2004 | Wydeven |
| 6,746,518 | B2 * | 6/2004 | Gieseke et al. ................. 95/273 |
| 6,783,565 | B2 | 8/2004 | Gieseke et al. |
| 6,826,856 | B1 | 12/2004 | McCabe |
| 6,852,141 | B2 * | 2/2005 | Bishop et al. ................. 55/385.3 |
| 6,887,343 | B2 | 5/2005 | Schukar et al. |
| D506,539 | S | 6/2005 | Bishop et al. |
| 6,953,124 | B2 | 10/2005 | Winter et al. |
| 6,966,940 | B2 * | 11/2005 | Krisko et al. .................... 55/497 |
| 7,008,467 | B2 * | 3/2006 | Krisko et al. .................... 95/268 |
| 7,090,712 | B2 * | 8/2006 | Gillingham et al. ............ 55/486 |
| 7,211,124 | B2 * | 5/2007 | Gieseke et ...................... 55/357 |
| 7,255,300 | B2 | 8/2007 | Johnston |
| 7,261,756 | B2 | 8/2007 | Merritt |
| 7,318,851 | B2 | 1/2008 | Brown et al. |
| 7,329,326 | B2 | 2/2008 | Wagner et al. |
| 7,351,270 | B2 * | 4/2008 | Engelland et al. ............... 55/502 |
| 7,396,375 | B2 * | 7/2008 | Nepsund et al. ................. 55/481 |
| 7,569,090 | B2 | 8/2009 | Nelson |
| 7,736,410 | B2 * | 6/2010 | Kuempel et al. ................ 55/481 |
| 7,905,936 | B2 * | 3/2011 | Coulonvaux et al. ........... 55/357 |
| 2002/0184864 | A1 | 12/2002 | Bishop et al. |
| 2003/0037675 | A1 * | 2/2003 | Gillingham et al. ............. 95/280 |
| 2003/0121845 | A1 | 7/2003 | Wagner et al. |
| 2003/0217534 | A1 | 11/2003 | Krisko et al. |
| 2004/0216434 | A1 | 11/2004 | Gunderson |
| 2005/0022669 | A1 | 2/2005 | Xu |
| 2005/0166561 | A1 | 8/2005 | Schrage et al. |
| 2006/0081528 | A1 * | 4/2006 | Oelpke et al. ............... 210/493.1 |
| 2006/0090431 | A1 | 5/2006 | Brown |
| 2006/0091061 | A1 | 5/2006 | Brown |
| 2006/0091064 | A1 | 5/2006 | Brown et al. |
| 2006/0091066 | A1 | 5/2006 | Driml et al. |
| 2006/0091084 | A1 | 5/2006 | Merritt et al. |
| 2006/0163150 | A1 | 7/2006 | Golden et al. |
| 2007/0169449 | A1 | 7/2007 | Merritt |
| 2007/0186528 | A1 | 8/2007 | Wydeven et al. |
| 2007/0193236 | A1 | 8/2007 | Merritt |
| 2008/0011896 | A1 | 1/2008 | Johnston et al. |
| 2008/0060329 | A1 | 3/2008 | Brown et al. |
| 2008/0196368 | A1 * | 8/2008 | Waibel ........................ 55/385.3 |
| 2008/0250763 | A1 | 10/2008 | Widerski et al. |
| 2009/0145093 | A1 * | 6/2009 | Krisko et al. .................... 55/321 |

FOREIGN PATENT DOCUMENTS

| | | |
|---|---|---|
| DE | 4 415 890 | 11/1995 |
| EP | 0 900 115 | 7/2002 |
| EP | 1 169 109 | 4/2004 |
| EP | 1 556 156 | 10/2008 |
| JP | 59-026113 | 2/1984 |
| JP | 62-11413 | 8/1988 |
| WO | WO 97/40917 | 11/1997 |
| WO | WO 97/40918 | 11/1997 |
| WO | WO 00/50149 | 8/2000 |
| WO | WO 00/50152 | 8/2000 |
| WO | WO 2004/007054 | 1/2004 |
| WO | WO 2005/014909 | 2/2005 |
| WO | WO 2005/077487 | 8/2005 |
| WO | WO 2006/009766 | 1/2006 |
| WO | WO 2007/009039 | 1/2007 |

OTHER PUBLICATIONS

U.S. Appl. No. 60/627,603, filed Nov. 12, 2004.
U.S. Appl. No. 60/699,072, filed Jul. 13, 2005.
Exhibit 1, Fig. 32 of U.S. 2003/0037675.
Exhibit A, Statement of Thomas Miller.
Exhibit B, Second Statement of Thomas Miller.

* cited by examiner

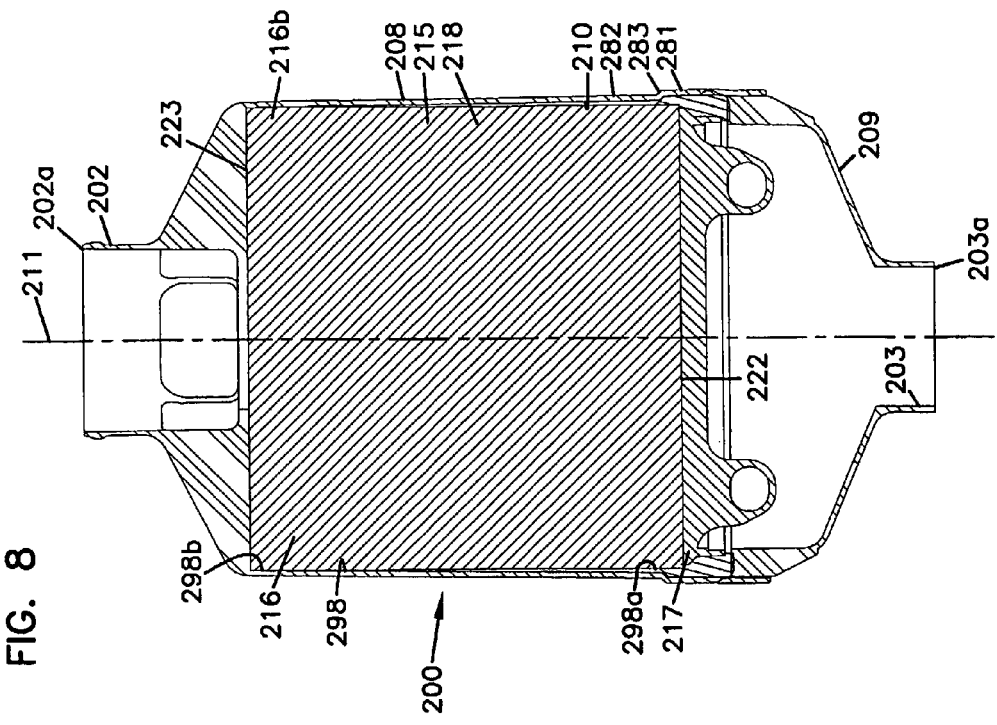
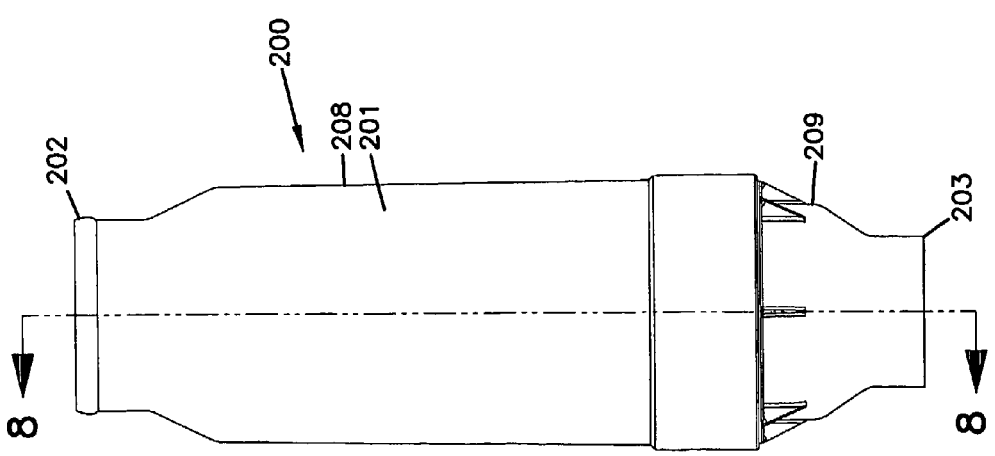

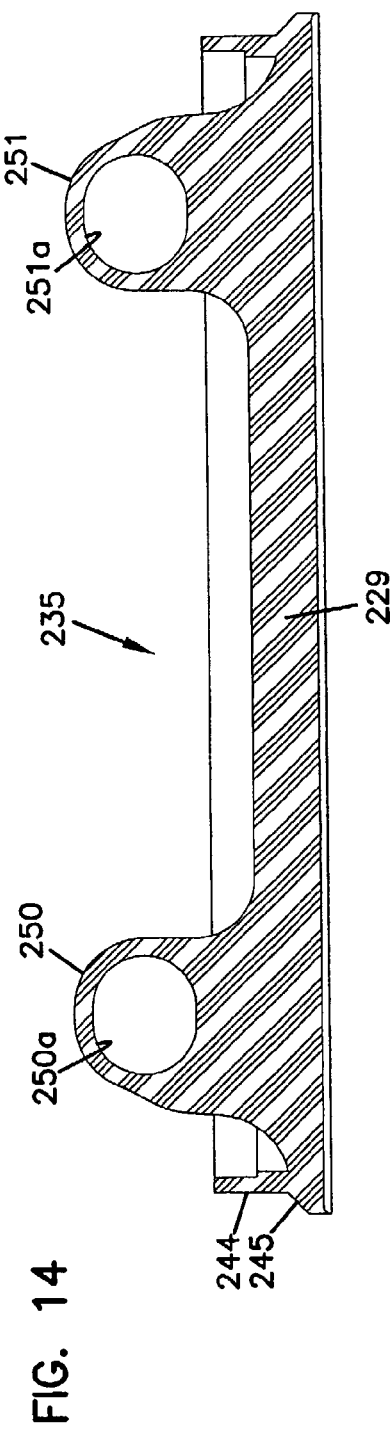
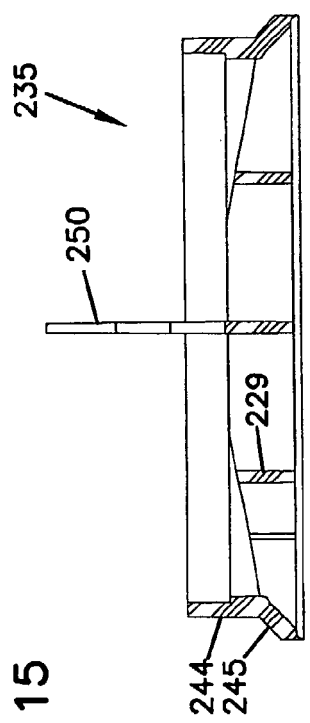
FIG. 14
FIG. 15

Z-FILTER MEDIA PACK ARRANGEMENT; FILTER CARTRIDGE; AIR CLEANER ARRANGEMENT; AND, METHODS

This application is a National Stage Application of PCT/US2005/025817, filed Jul. 20, 2005, which is the International Application of Ser. No. 60/589,428, filed Jul. 20, 2004 and which application(s) are incorporated herein by reference. A claim of priority to both, to the extent appropriate is made.

FIELD OF THE DISCLOSURE

The present disclosure relates to filter media for use in filtering gases. The disclosure particularly relates to media packs that use z-filter media which comprises a corrugated media sheet secured to facing sheet, formed into a media pack. Specifically, the disclosure relates to formation of such media packs and their inclusion in serviceable filter cartridge arrangements, typically for use in air cleaners. An air cleaner arrangement and methods of assembly and use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material been removed from (or have its level reduced in) the fluid. A variety of fluid filter (air or liquid filter) arrangements have been developed for contaminant rejection. However, continued improvements are sought.

SUMMARY

According to the present disclosure various techniques and arrangements are provided, for use in air cleaners and filter cartridges for air cleaners. In the embodiments shown in the figures, the techniques are demonstrated. It is noted that not all of the techniques and arrangements described must be incorporated in a system, for the system to achieve some advantage according to the present disclosure.

A particular preferred filter cartridge is depicted which utilizes a media pack comprising a corrugated sheet secured to a facing sheet to form a plurality of inlet flutes and outlet flutes, extending axially between opposite inlet and outlet flow faces. Secured to one end of the media pack is provided a framework arrangement with a seal arrangement thereon. The framework arrangement includes a peripheral seal support, preferably including an axial extension projecting outwardly away from the associated media pack face; a handle arrangement; and, a structure arrangement for transferring handling (insertion/removal) forces from the handle arrangement through to the seal support, without transfer of those forces through the media pack. The seal arrangement is positioned on the axial seal support and in a configuration to form a housing seal with an air cleaner housing, in use. Preferably the housing seal portion of the seal arrangement is configured as a radial seal, most preferably with an insertion direction toward the media pack.

Preferably the seal arrangement also includes a portion sealing a joint, interface, or intersection between the framework and a side wall of media pack, preferably around the media pack.

Also preferably the seal arrangement includes an outer axial seal surface remote from the media pack, for forming a cover seal with a housing component, in use.

According to the present disclosure an air cleaner arrangement is provided, for use with cartridges as characterized above. The air cleaner arrangement includes a housing having an interior for receiving the filter cartridge. The preferred housing shown has a first section within an open end for receiving the filter media pack and a cover member or section for positioning over the open end of the first housing section. The cover preferably includes a portion for forming a seal with the cover seal portion of the seal arrangement, when installed. The housing first section preferably includes an end flare, at an open end thereof, to form a radial seal with the housing seal portion, when the filter cartridge is installed. Preferably the cover portion of the housing includes an axial air flow inlet, and the housing includes an axial air flow outlet at an end opposite the cover.

In some applications, the air cleaner is preferably configured to be mounted with the inlet directed down and the outlet directed up.

According to the present disclosure a method of installation or service of an air cleaner, involving insertion of a filter cartridge and sealing in position, is provided. Also described is a system including an air cleaner of the type characterized herein.

BRIEF DESCRIPTION OF THE DRAWINGS

FIG. 7 is a schematic, side elevational view of the air cleaner assembly of FIG. 6.

FIG. 8 is a cross-sectional view taken along line 8-8, FIG. 7.

FIG. 14 is a cross-sectional view taken along line 14-14, FIG. 13.

FIG. 15 is a cross-sectional view taken along line 15-15, FIG. 13.

FIG. 16 being taken across a narrower cross-sectional view in accord with line 16-16, FIG. 17.

FIG. 21 being an inlet end perspective view.

DETAILED DESCRIPTION

I. Z-Filter Media Configurations

Generally

Figure 1:
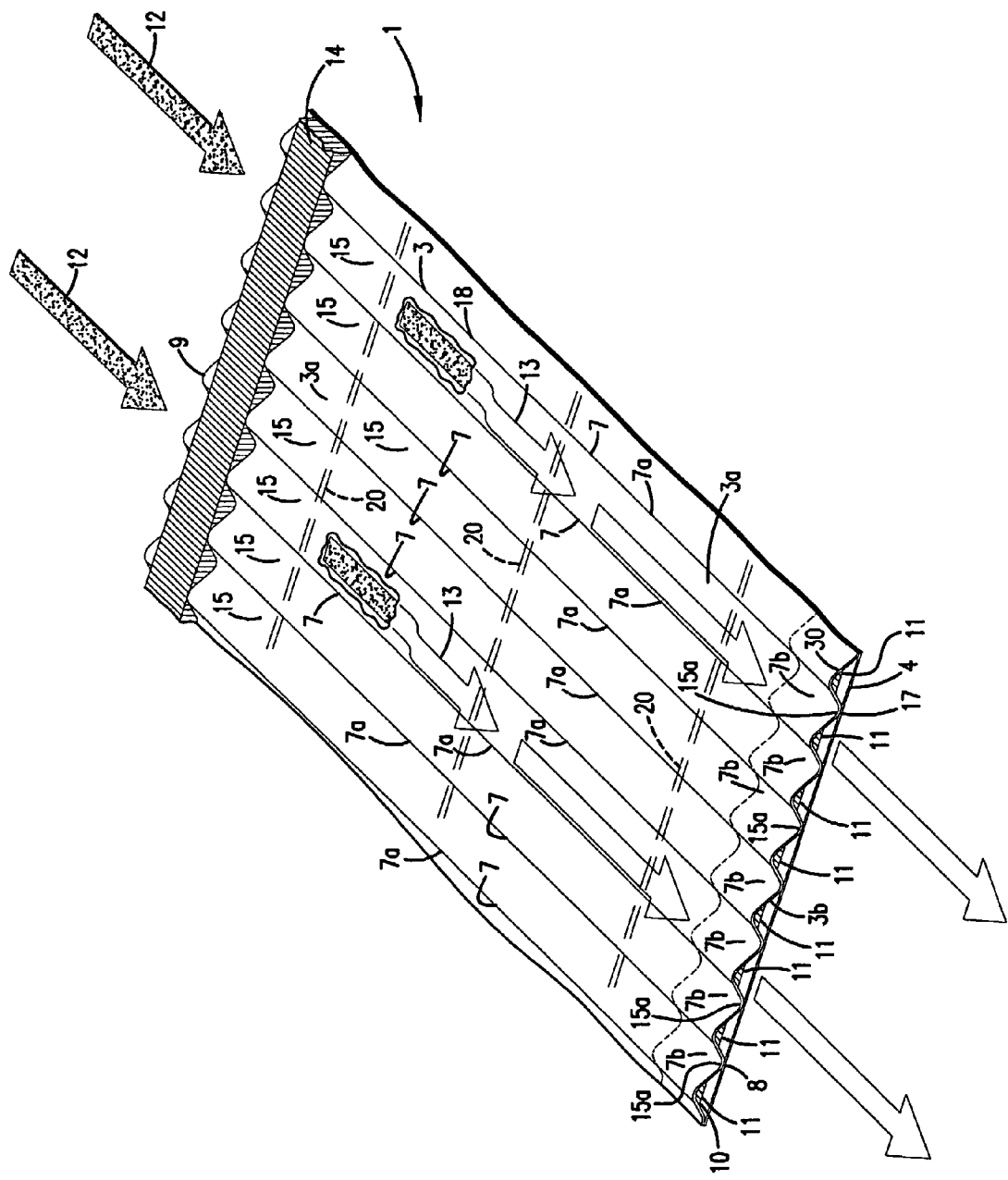
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to flat media, are stacked on one another, to create a filter construction. An example of this is described in FIG. 11 of U.S. Pat. No. 5,820,646, incorporated herein by reference.

For specific applications as described herein, coiled arrangements are preferred.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application U.S. 04/07927, filed Mar. 17, 2004, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow. system is shown in U.S. Pat. No. 5,613,992, incorporated by reference herein.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

In FIG. 1, an example of media 1 useable in z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, and typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant, typically as a bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided a sealant, typically as a bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3, facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
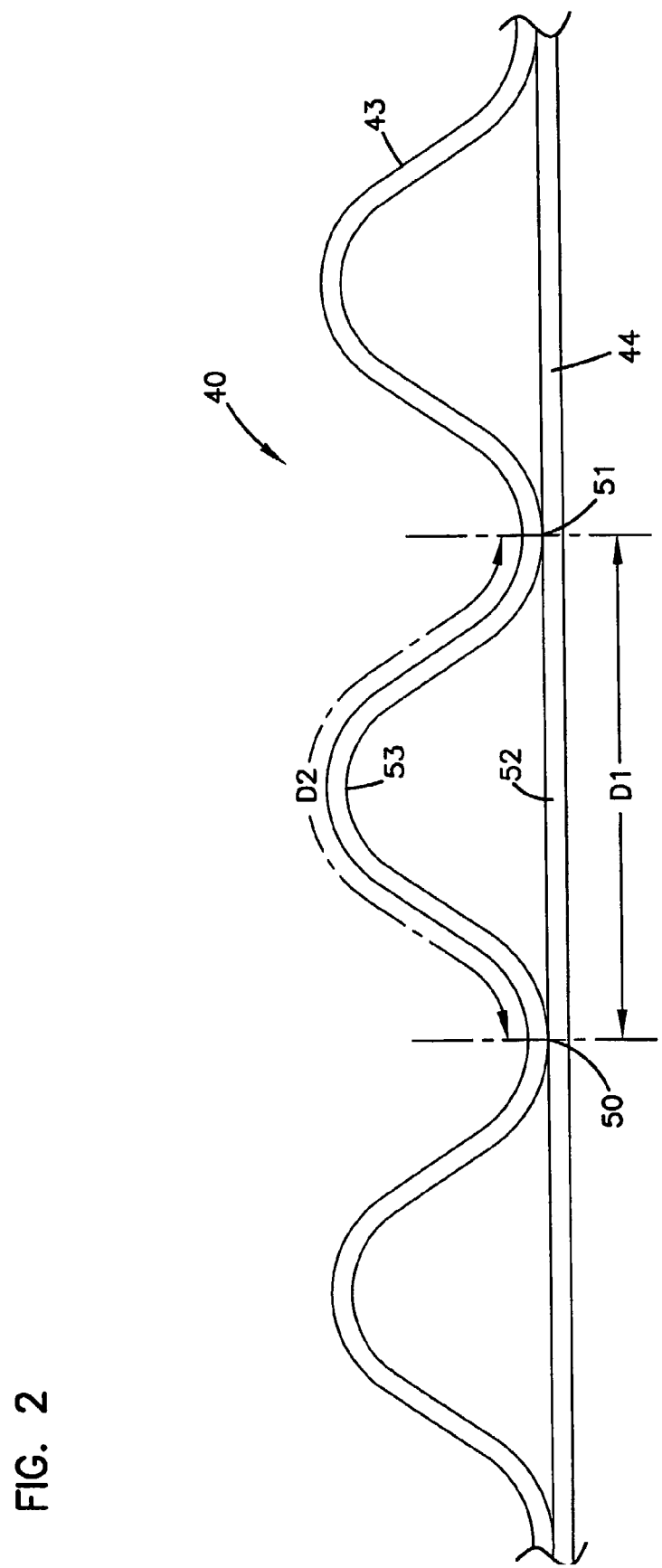
FIG. 2 is a schematic, cross-sectional view of a portion of the media depicted in FIG. 1.

Attention is now directed to FIG. 2, in which a z-filter media construction 40 utilizing a regular, curved, wave pattern corrugated sheet 43, and a facing sheet 44, is schematically depicted. The distance D1, between points 50 and 51, defines the extension of facing media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
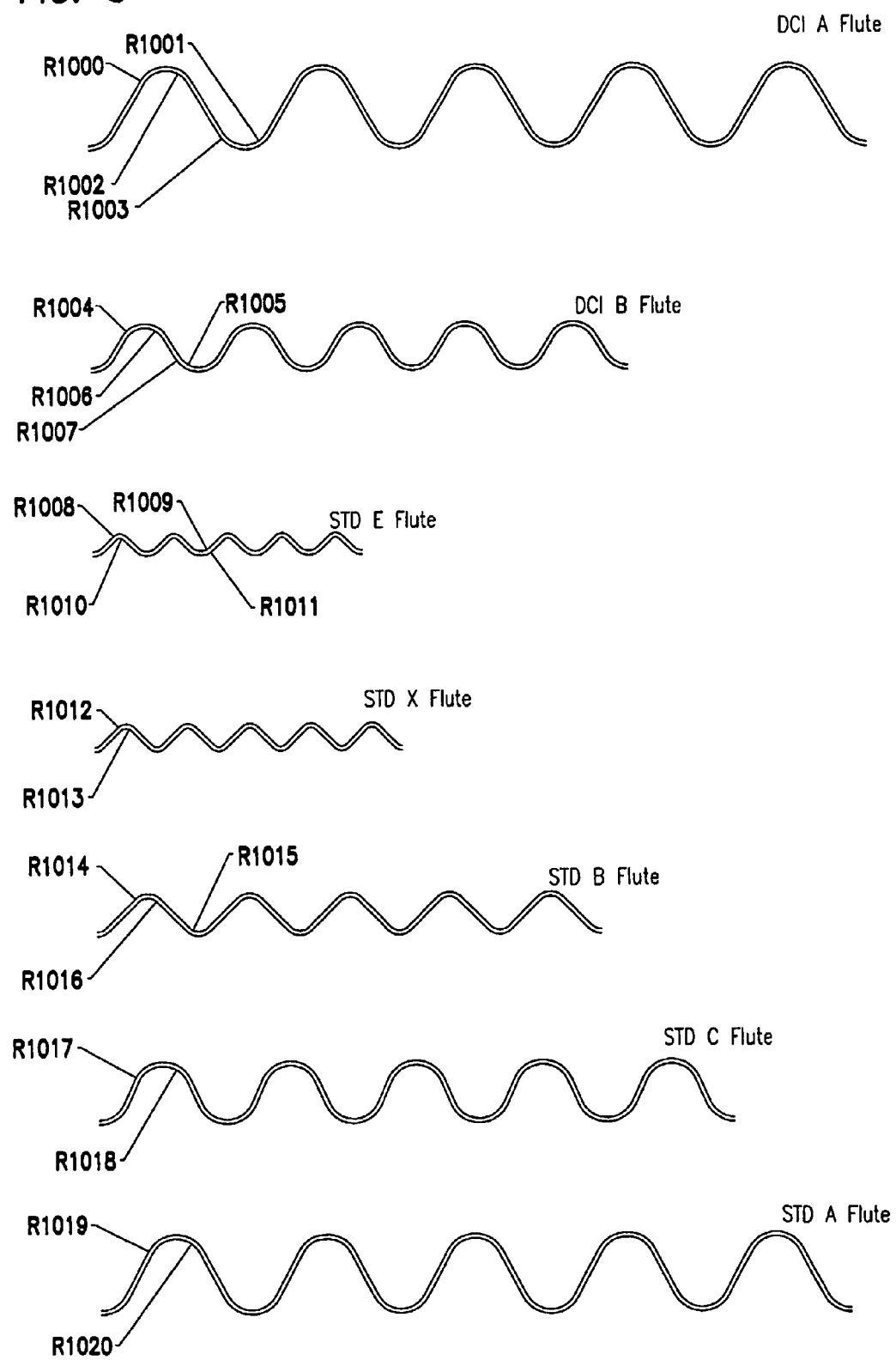
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI Flute/flat = 1.52:1; The Radii (R) are as follows:
A R1000 = .0675 inch (1.715 mm); R1001 = .0581 inch (1.476 mm);
Flute: R1002 = .0575 inch (1.461 mm); R1003 = .0681 inch (1.730 mm);
DCI Flute/flat = 1.32:1; The Radii (R) are as follows:
B R1004 = .0600 inch (1.524 mm); R1005 = .0520 inch (1.321 mm);
Flute: R1006 = .0500 inch (1.270 mm); R1007 = .0620 inch (1.575 mm);
Std. Flute/flat = 1.24:1; The Radii (R) are as follows:

TABLE A-continued (Flute definitions for FIG. 3)

E R1008 = .0200 inch (.508 mm); R1009 = .0300 inch (.762 mm);
Flute: R1010 = .0100 inch (.254 mm); R1011 = .0400 inch (1.016 mm);
Std. Flute/flat = 1.29:1; The Radii (R) are as follows:
X R1012 = .0250 inch (.635 mm); R1013 = .0150 inch (.381 mm);
Flute:
Std. Flute/flat = 1.29:1; The Radii (R) are as follows:
B R1014 = .0410 inch (1.041 mm); R1015 = .0310 inch (.7874 mm);
Flute: R1016 = .0310 inch (.7874 mm);
Std. Flute/flat = 1.46:1; The Radii (R) are as follows:
C R1017 = .0720 inch (1.829 mm); R1018 = .0620 inch (1.575 mm);
Flute:
Std. Flute/flat = 1.53:1; The Radii (R) are as follows:
A R1019 = .0720 inch (1.829 mm); R1020 = .0620 inch (1.575 mm).
Flute:

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

Figure 4:
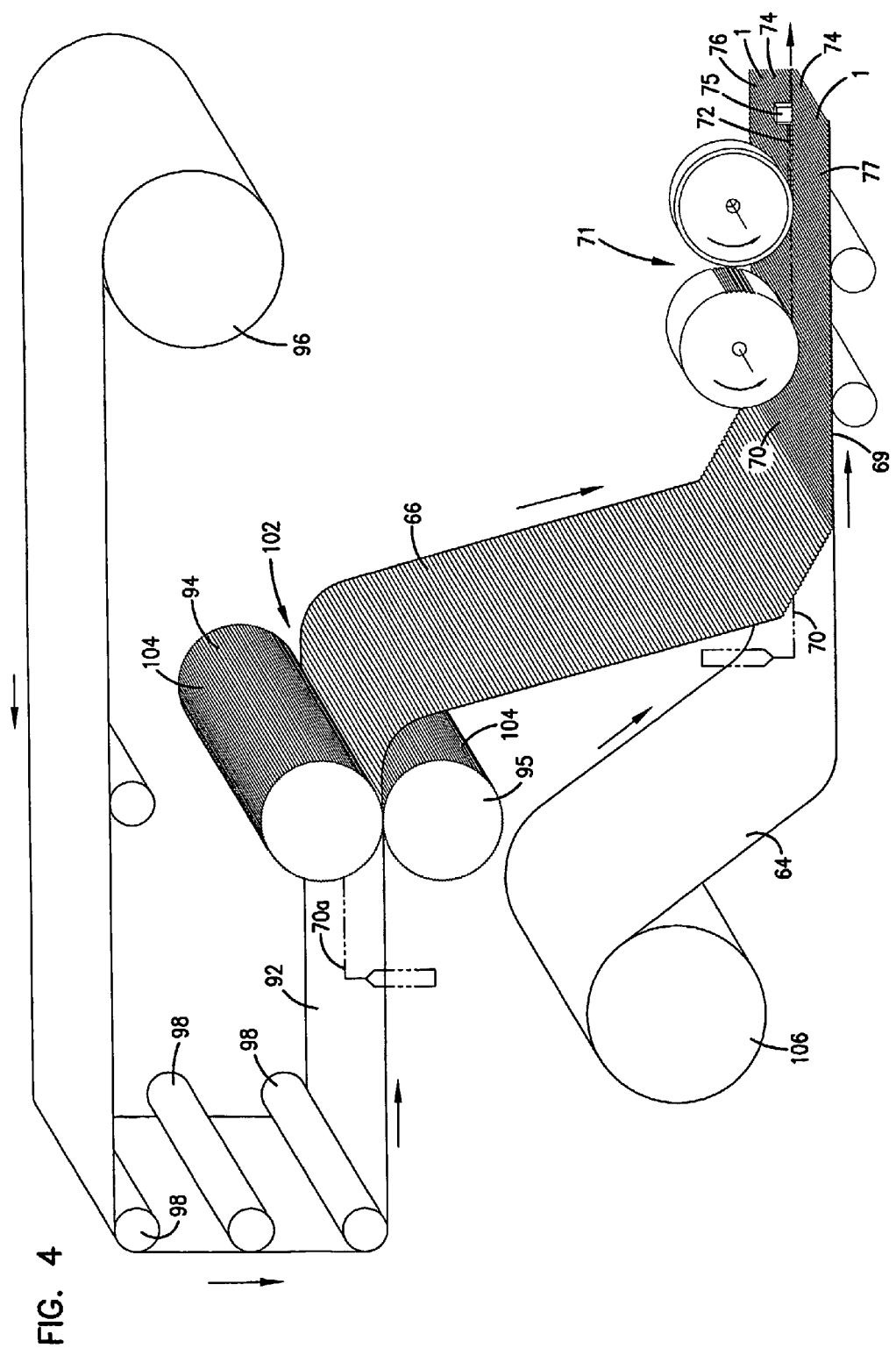
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations (across the sheet 92 perpendicular to the machine direction) after the sheet 92 passes through the nip 102. After passing through the nip 102, the sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the z-filter media 74. The corrugated sheet 66 and the facing sheet 64 are secured together by adhesive or by other means (for example by sonic welding).

Referring to FIG. 4, an adhesive line 70 is shown used, to secure corrugated sheet 66 and facing sheet 64 together, as the sealant bead. Alternatives are possible, for example the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

Figure 5:
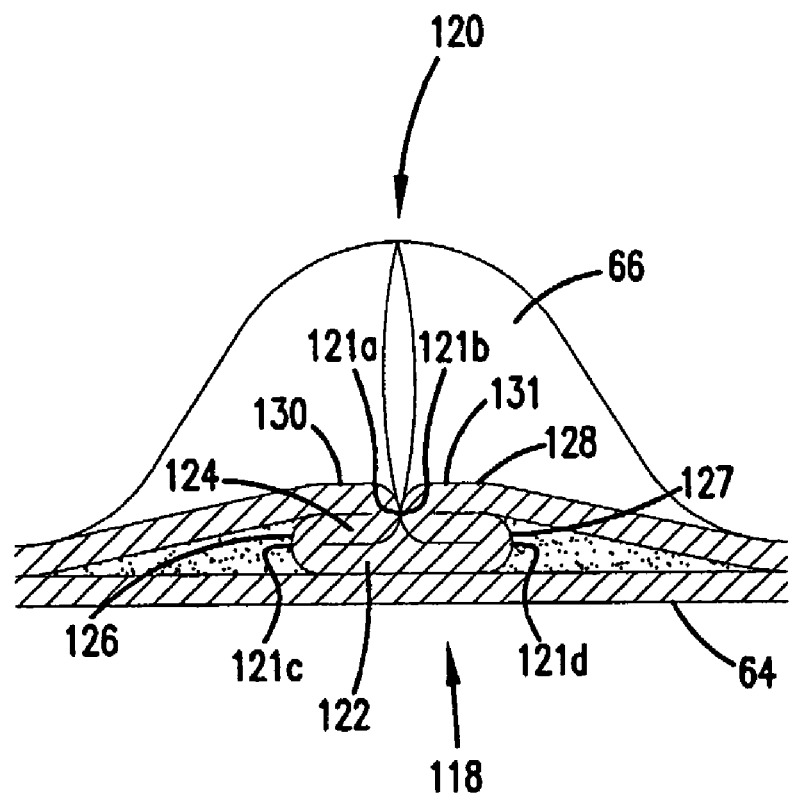
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements folded against, the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application U.S. 04/07927, filed Mar. 17, 2004, incorporated herein by reference.

Techniques described herein are particularly well adapted for use in media packs that result from coiling a single sheet comprising a corrugated sheet/facing sheet combination, i.e., a "single facer" strip. Certain of the techniques can be applied with arrangements that, instead of being formed by coiling, are, for example, formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application U.S. 04/07927. Other useable shapes are obround, some examples of obround being oval shapes. In general, oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application U.S. 04/07927.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (single facer bead, winding bead or stacking bead) can be formed from a variety of materials. In various ones of the cited and incorporated references, hot melt or polyurethane seals are described as possible for various applications.

III. A Preferred Serviceable Filter Cartridge

Air Cleaner for Use with the Filter Cartridge

A. General Air Cleaner Features

Figure 6:
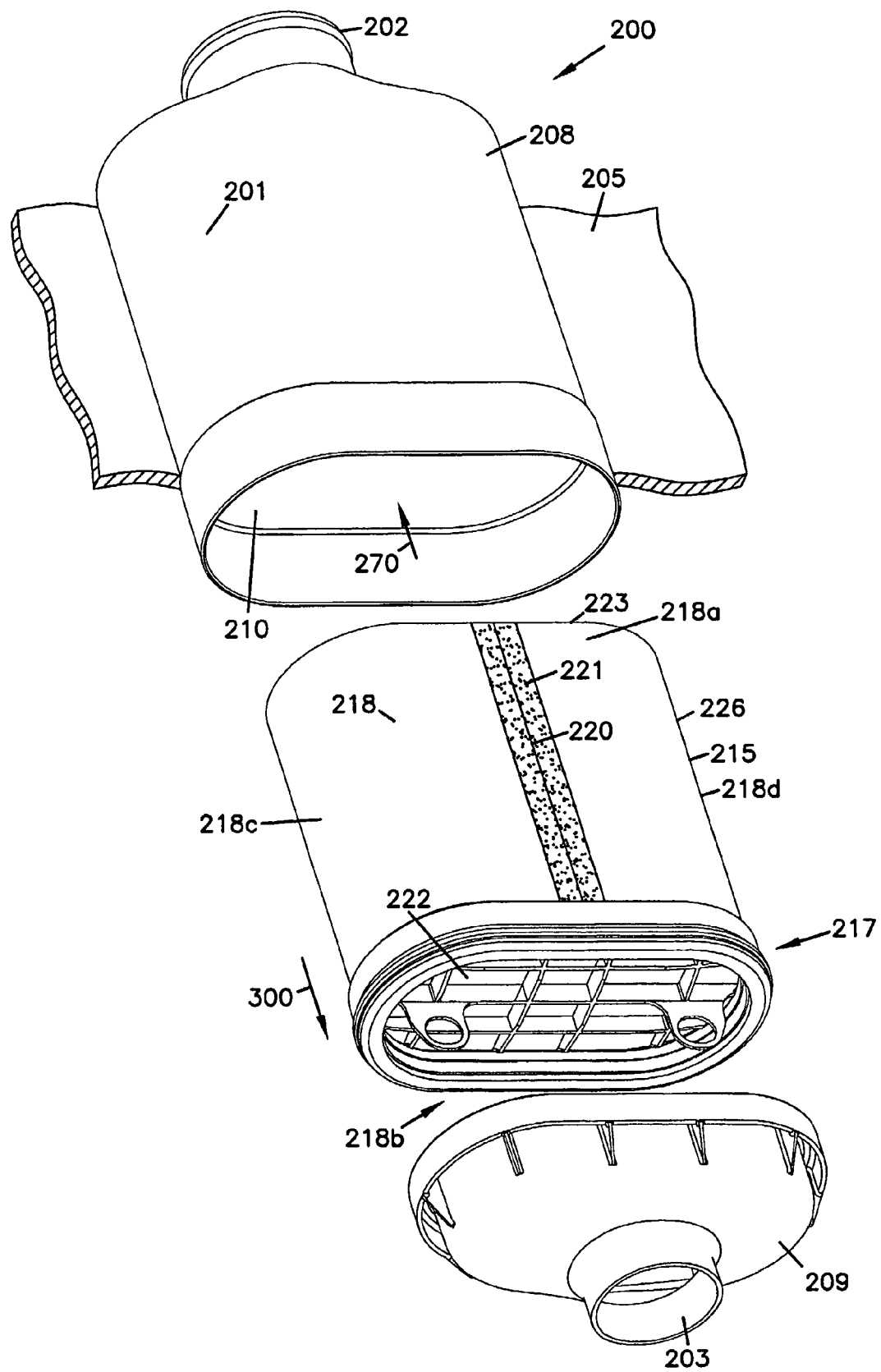
FIG. 6 is a schematic exploded perspective view of an air cleaner including a filter cartridge according to the present disclosure, mounted on a portion of a vehicle.

The reference numeral 200, FIG. 6, generally depicts an air cleaner assembly according to the present disclosure. The air cleaner assembly 200 is depicted in exploded perspective view in FIG. 6, and in a non-exploded view in FIG. 7.

Referring to FIG. 7, the air cleaner assembly comprises a housing 201 having an air flow outlet 202, and an air flow inlet 203. Although alternatives are possible, a useful operational orientation for the air cleaner 200 is depicted in FIG. 7, with outlet 202 positioned vertically above inlet 203. In FIG. 6, air cleaner 200 is shown mounted on equipment support framework 205, in this orientation.

Although alternatives are possible, in the particular arrangements shown the outlet 202 and inlet 203 are both axial. By "axial" in this context, it is meant that each is centered on, and is directed along, a central axis, indicated at 211, FIG. 8, of the air cleaner 200. They are also directed oppositely from one another, in the particular example shown.

Referring again to FIG. 7, the housing 201 comprises a first, main, filter cartridge receiving section 208 and a separable inlet end cover section 209 which, together, define a housing interior 210, FIG. 8. For the particular arrangement shown, section 209 includes inlet 203 thereon, and section 208 includes outlet 202 thereon. Referring to FIG. 8, it is again noted that for the assembly 200 shown, the inlet 203 and outlet 202 are positioned centered around the same central axis 211, although alternatives are possible. Herein, when the air flow inlet 203 and air flow outlet 202 are positioned centered on the same axis 211, they will sometimes be characterized as "axially aligned."

It is noted that housing 201 is depicted schematically. For example, typically latches, screws or other arrangements would be used to secure section 209 in place on section 208, such latches not being shown in the present drawings. A variety of latches, including, for example, wire latches analogous to those described in U.S. Pat. Nos. 6,190,432, 6,350,291 and 6,179,890, can be adapted and used. Alternatively, a clip arrangement could be used.

Referring to FIG. 6, air cleaner assembly 200 includes serviceable filter cartridge 215. By the term "serviceable" in this context, it is meant that filter cartridge 215 is configured to be removably (operably) positioned within housing interior 210, during use. Cartridge 215 is typically a service component; thus it can be removed and be replaced after a period of use. In general operation, air drawn through inlet 203 into housing interior 210, is passed through filter cartridge 215. Filter cartridge 215 generally comprises a media pack 216. As the air flows through the media pack 216 it is filtered. The filtered air then passes outwardly from housing 201 through outlet 202, to then be directed to an engine air intake or other componentry.

In a typical operation, conduit arrangements will be secured to inlet 203 and outlet 202, to direct air appropriately.

B. The Serviceable Filter Cartridge 215

The filter cartridge 215, FIG. 6, generally comprises media pack 216 and end framework/seal arrangement 217; end framework/seal arrangement 216 being secured to the media pack 216.

The media pack arrangement 216 preferably comprises a z-filter media in general accord with the descriptions in Sections I and II above. The particular media pack 216 depicted, comprises an oval shape, in particular a racetrack oval shaped media pack 218, with opposite sides 218a, 218b, and opposite curved ends 218c, 218d, although alternatives are possible.

In general, when a single facer strip is coiled to form media pack 216, a tail end 220, FIG. 6, is left in the coil. It is typically preferred to seal the tail end 220 along its length, with respect to: (a) leakage at edge between the corrugated media and the facing piece; and, (b) at an edge between a single facer strip and the next underneath coil. Such a seal is shown in FIG. 6 provided along tail end 220, by a sealant field 221 positioned thereover. The sealant field 221 can comprise, for example, a hot melt sealant or other sealant material. Such seals are described in U.S. Provisional Application 60/556,133, filed Mar. 24, 2004, incorporated herein by reference.

It is noted that generally along the interior of media pack 216 there is provided a lead end, which also needs to be sealed. Techniques for sealing the lead end are described, for example in U.S. Provisional Application 60/578,482, filed Jun. 8, 2004, and such techniques are useable herein.

Referring still to FIG. 6, the media pack 216 includes an inlet end or face 222 and an opposite outlet end or face 223. For the particular media pack 216 depicted, inlet end face 222 and outlet end face 223 are generally each planar, and each is positioned parallel to the other. It is noted that alternate configurations are possible, for example ones in which the end faces 222, 223 are not planar.

Generally, media pack 216 comprises a plurality of inlet flutes and outlet flutes extending between the end faces 222, 223, in accord with the descriptions above in Sections I and II. The inlet flutes would typically be open at or near inlet end 222 and sealed at or near outlet end 223; and, the outlet flutes would typically be sealed at or near end 222 and open at or near outlet end 223.

Still referring to FIG. 6, for the particular filter cartridge 215 depicted, the preferred inlet end framework/seal arrangement 217 depicted includes: housing seal 225; housing seal support 226 (FIG. 11); cover seal region 228; inlet face grid work 229; and handle arrangement 230.

Figure 12:
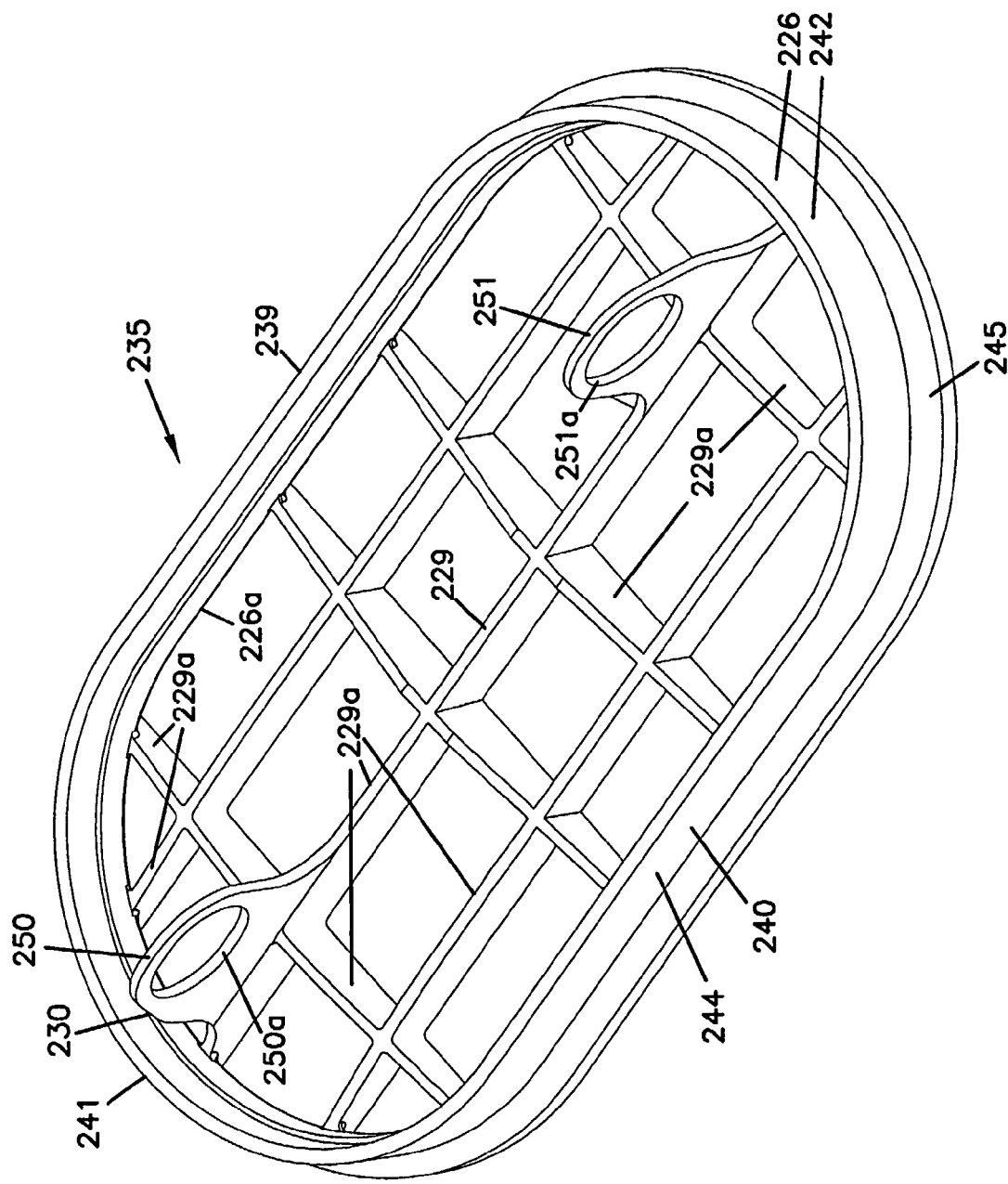
FIG. 12 is a perspective view of a component useable in the filter cartridge of FIGS. 10 and 11.
Figure 13:
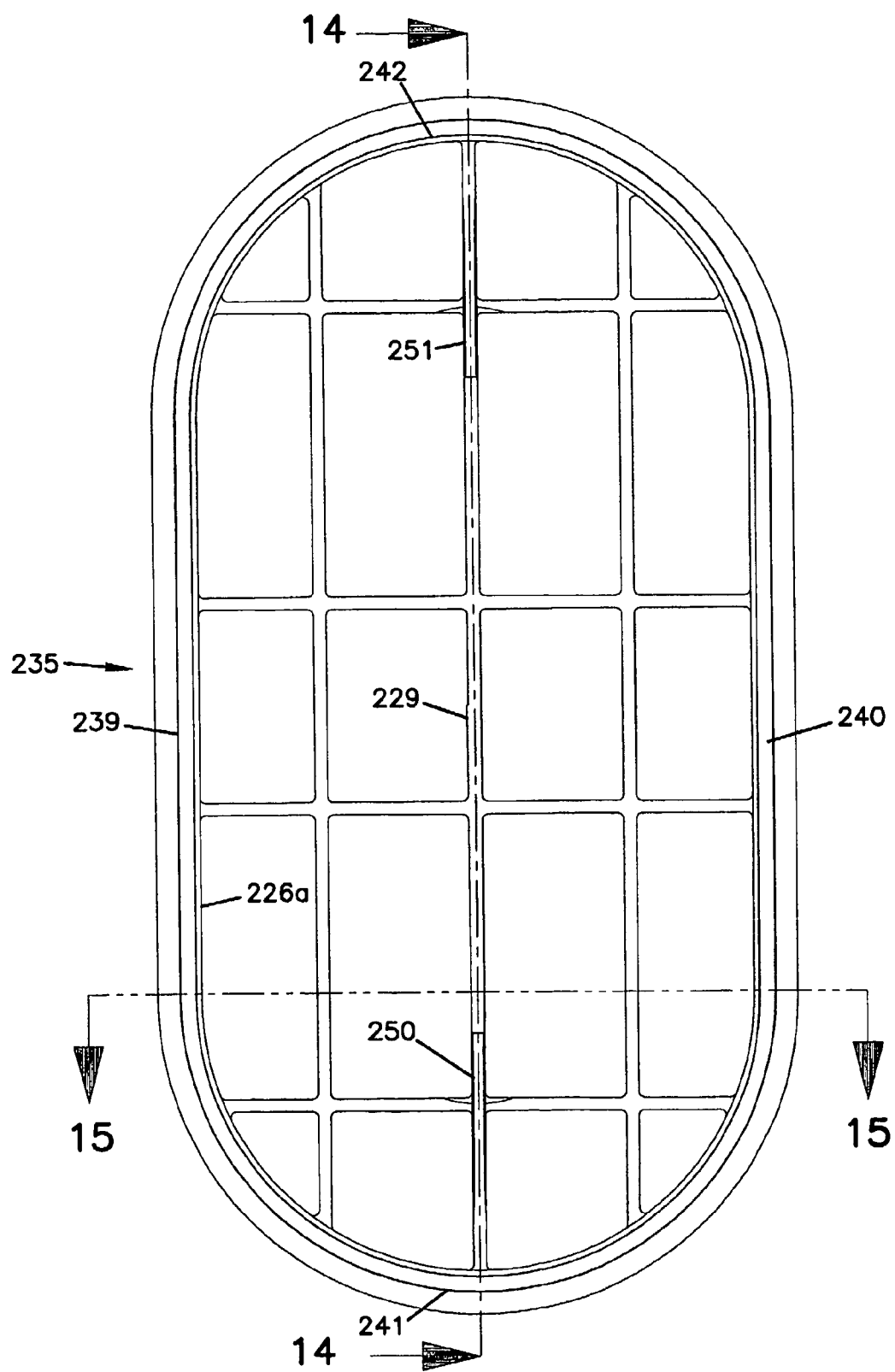
FIG. 13 is a top plan view of the filter cartridge component of FIG. 12.
Figure 16:
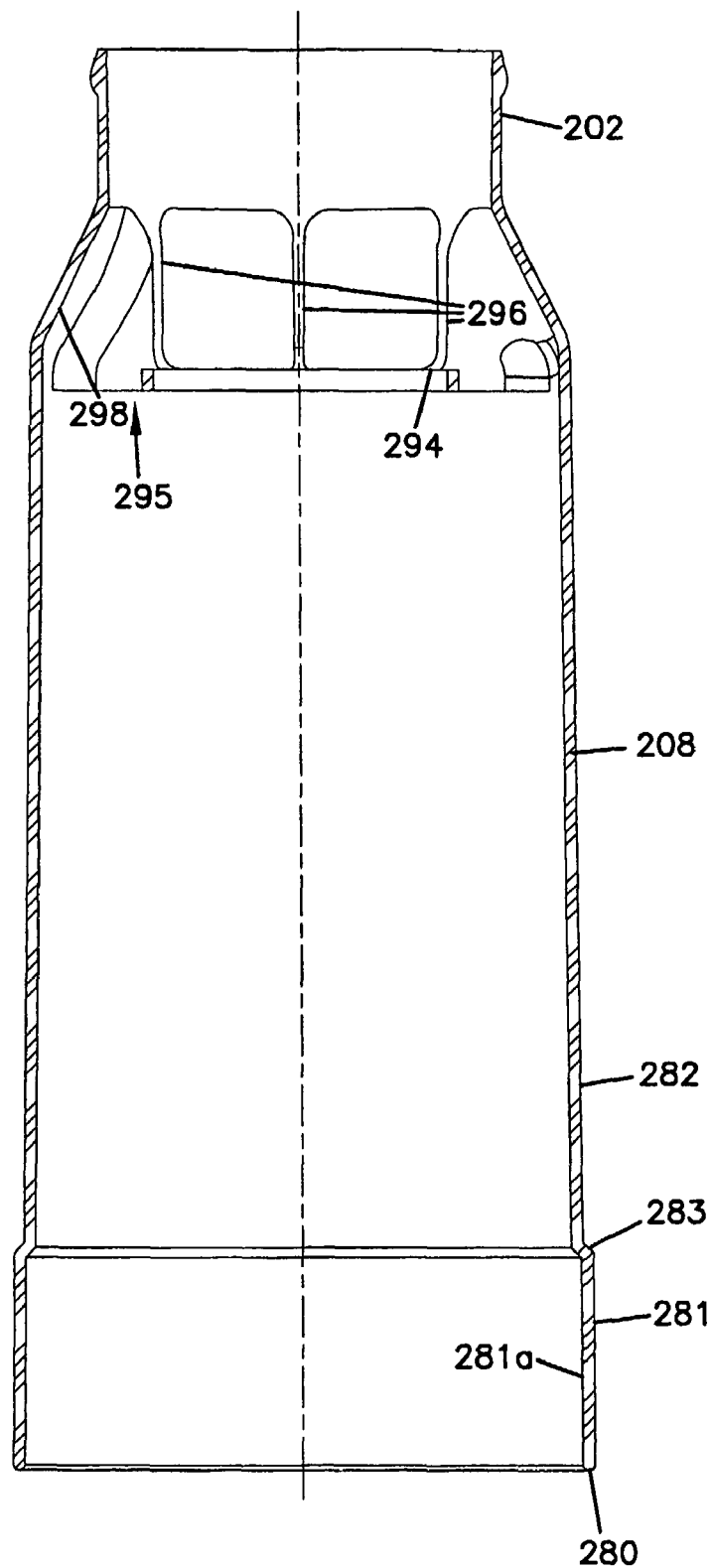
FIG. 16 is a cross-sectional view of a housing component of the assembly of FIGS. 6-9.
Figure 17:
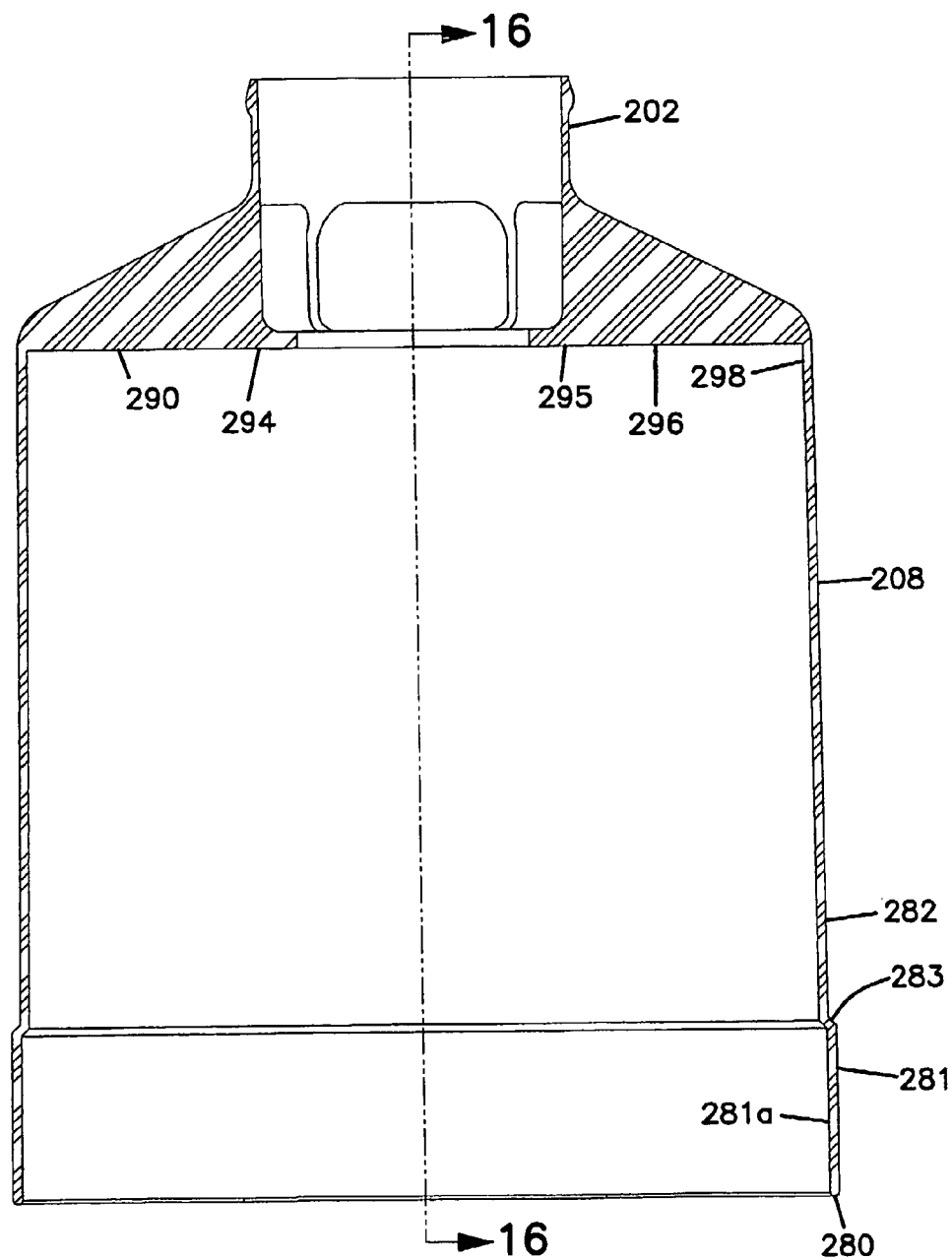
FIG. 17 is a cross-sectional view of the housing component of FIG. 16, being taken along the wider cross-sectional dimension of line 17-17, FIG. 18.
Figure 18:
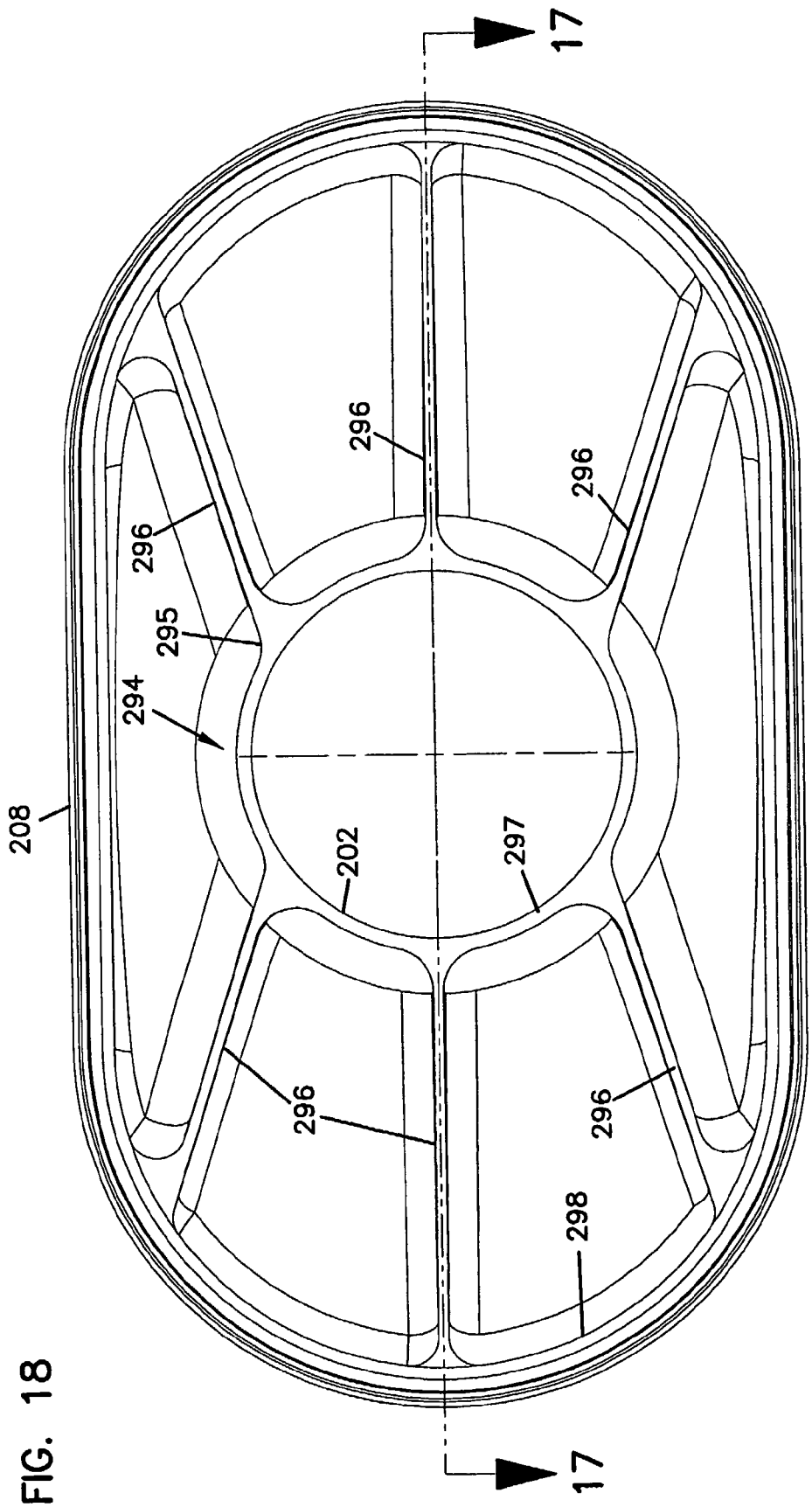
FIG. 18 is a plan view directed toward the interior of the housing component.
Figure 19:
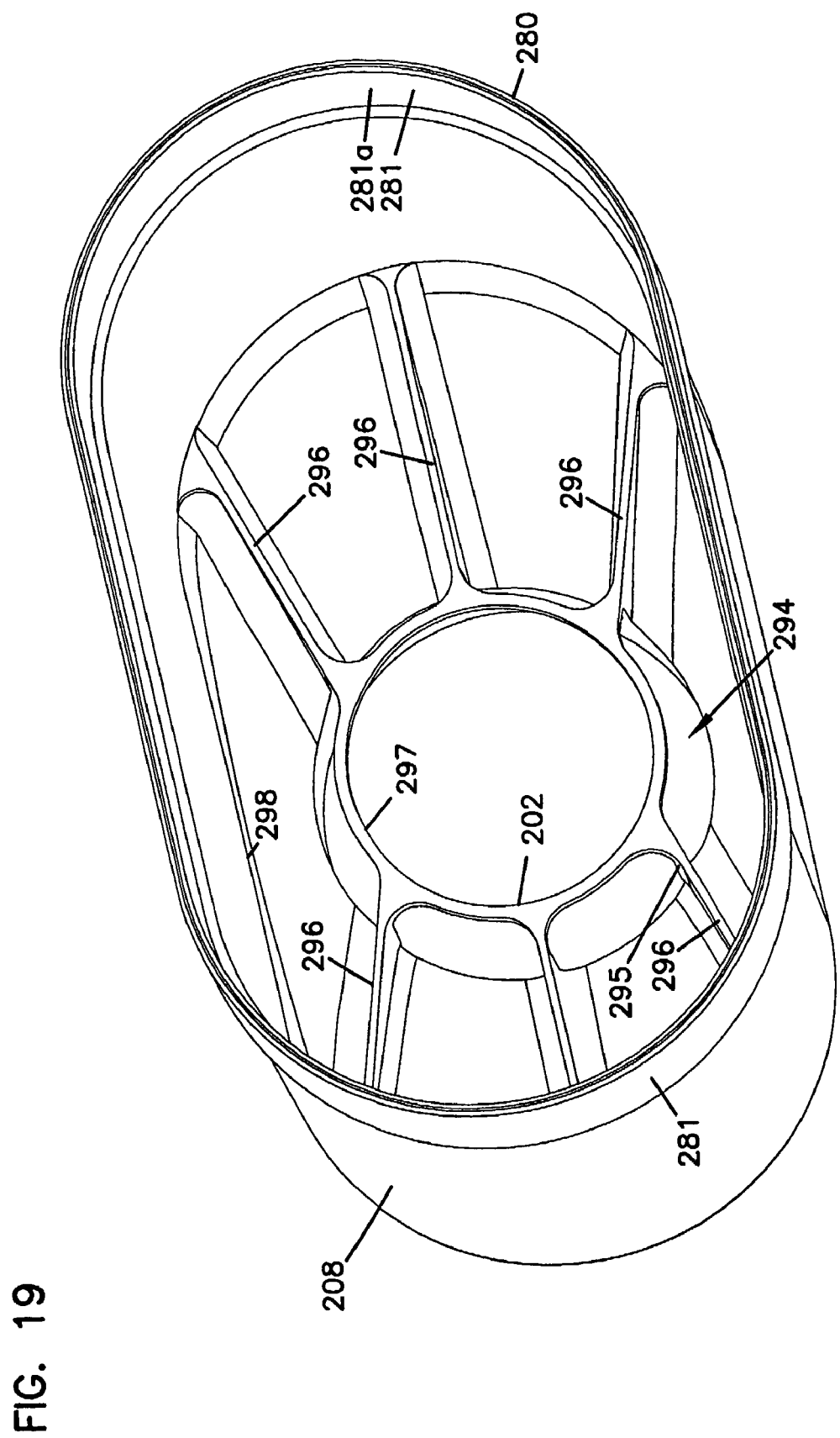
FIG. 19 is a perspective view directed toward the interior of the housing component of FIGS. 16-18.

In the particular filter cartridge 215 depicted, the housing seal support 226, inlet face grid 229, and handle arrangement 230 are integral components of an (inlet) end frame piece 235, FIG. 12, that is secured to and (inlet) end 222 of the media pack 216. Further, for the particular filter cartridge 215 depicted, the housing seal 225 and cover seal 228 are integral components of a single seal arrangement 236 positioned at end 222.

Referring to FIG. 12, inlet end frame piece 235 is depicted. The frame piece 235 is configured for engagement with an end of the media pack 216 of FIG. 6; and for the particular arrangement shown, frame piece 235 has a similar oval outer perimeter shape with opposite sides 239, 240 and opposite curved ends 241, 242. In this instance, the oval perimeter shape is racetrack, with opposite sides 239, 240 being straight and parallel, although alternatives are possible.

Seal support 226 defines an outer perimeter of frame piece 235, and defines the oval shape. Seal support 226 comprises axial extension 244 and peripheral skirt or flare 245. The term "axial" as used herein refers to a direction of extension generally corresponding to the direction of air flow between inlet face 222 and outlet face 223 of media pack 216, during use, FIGS. 6 and 8. The seal extension 244 and flare 245 are viewable in cross-section, in FIGS. 14 and 15.

Referring to FIG. 12, housing seal support 226 generally defines an open interior 226a, for passage of air therethrough during use. Grid work 229 generally comprises extensions 229a spaced from one another and extending across interior 226a. Although alternatives are possible, extensions 229a are typically secured to flare 245, and are in a position to engage end 223 of media pack 216. Preferably, the grid work 229a is configured to be at least 50% open, more preferably at least 80% open. The grid work 229 may comprise a variety of configurations, the particular configuration of parallel and perpendicular cross pieces shown, merely being an example. The shape of the grid work 229a can be selected for ornamental reasons and/or to include source designating features (trademark/trade dress features).

Referring to FIG. 12, the handle arrangement 230 is configured to project axially outwardly from frame piece 235, away from media pack 216, FIG. 6, and in overlap with the media pack end face 222. The handle arrangement 230 is configured to allow a user to grasp cartridge 215, FIG. 6, and insert it into housing 201 or remove it therefrom, by forces applied to the handle arrangement 230.

Referring to FIG. 12, the particular handle arrangement 230 depicted, comprises two, relatively flat, spaced sections 250, 251 each having an aperture 250a, 251a, respectively therethrough, for easy grasping. The sections 250, 251, project axially outwardly away from media pack 216, in overlap with end face 222. They are preferably positioned with the sections 250, 251 extending in a direction between curved ends 241, 242 and parallel to sides 239, 240, although alternatives are possible Frame piece 235 may comprise a molded plastic piece, for example molded from a glass and/or mineral filled nylon. Frame piece 235 could alternately be assembled from metal, if desired.

In the context of FIG. 12, when it is characterized that portions of the frame piece 235 are integral herein, it is meant that the portions are not separable from piece 235, without destruction. Thus, the portions could be integrally molded as a single plastic piece, or welded or otherwise secured in the frame piece 235 from metal components. The term "integrally molded" as used herein, is meant to refer to components that are molded in a molding operation, from a single pool of resin.

Figure 11:
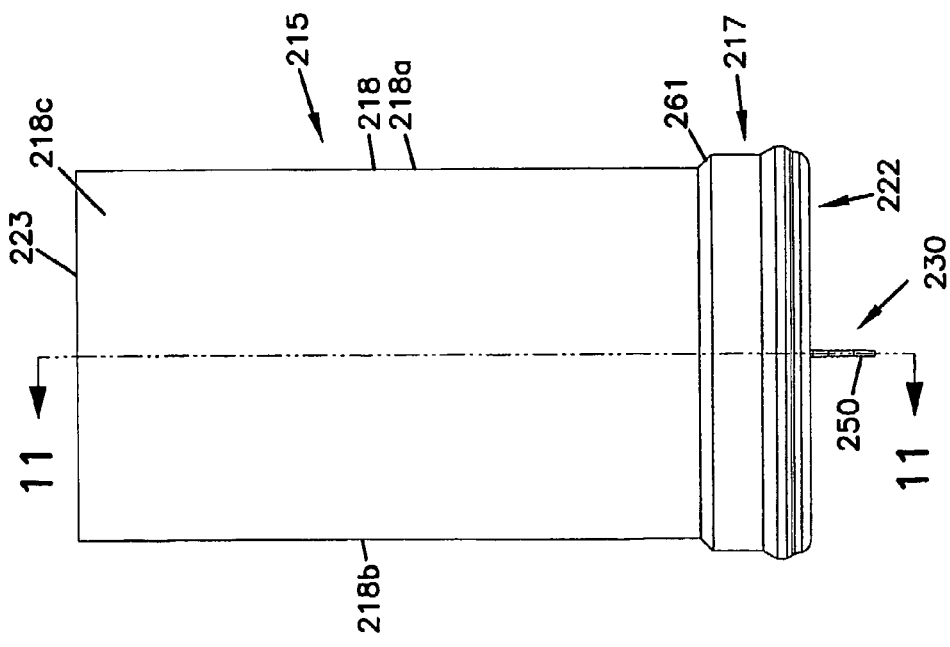
FIG. 11 is a schematic, cross-sectional view taken along line 11-11, FIG. 10.

Still referring to FIG. 12, it will be understood that the grid work 229a functions as a force transfer frame arrangement, to transfer forces from user grasping the handle arrangement 230, i.e., one or both of handles 250, 251, through to the housing seal support arrangement 226, at the same end of the media pack 216 as the handle arrangement 230, in particular to axial support 242, without those forces being transferred through the media pack 216, FIG. 11, in use. Advantages from this will be discussed further below.

Figure 10:
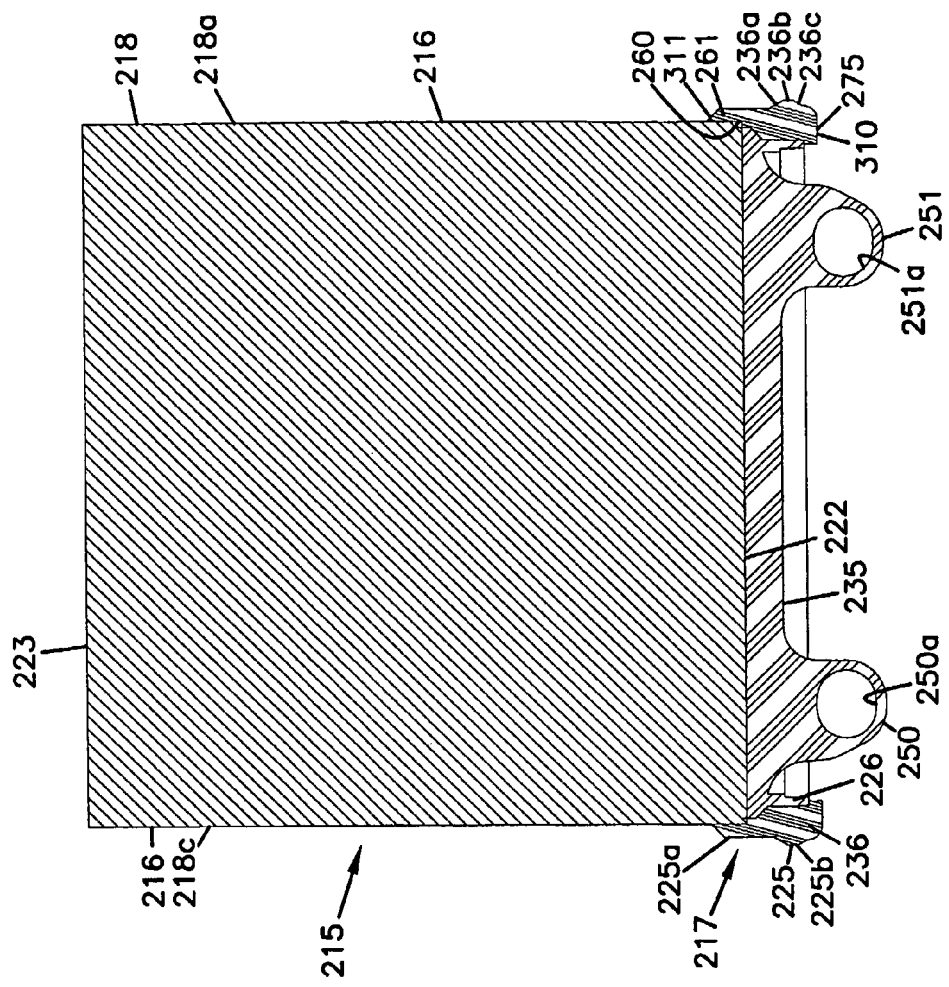
FIG. 10 is a side elevational view of a filter cartridge component useable in the air cleaner assembly of FIGS. 6-9.

Attention is now directed to FIGS. 10 and 11. In FIG. 10, filter cartridge 215 is shown in a side elevational view, the view being directed toward one of the curved sides 218c of the media pack 216. In FIG. 11, filter cartridge 215 is shown in cross-section, taken along line 11-11, FIG. 10. It is noted that in FIG. 11, the media pack 216 is shown schematically, without specific internal feature or definition.

In addition to the media pack 216 and inlet end framework piece 235, the filter cartridge 215 preferably includes the following:

1. A seal between the frame piece 235 and media pack 216, peripherally around the media pack 216, to inhibit leakage of air therebetween in use;
2. A housing seal positioned on the framework piece 235 for sealing engagement with the housing 208, to prevent air flow from inlet 203 reaching outlet 202 without passage through the media pack 216, FIG. 6; and,
3. An optional housing cover seal, to inhibit undesired air flow between housing section 208 and cover section 209, during use.

Referring to FIG. 11, these functions are provided by seal arrangement or seal material 236. More specifically, at region 260, FIG. 11, a joint or junction between frame piece 235 and media pack 216, adjacent outlet end 223 is provided. The joint 260 is sealed, by region 261 of seal material extending around a perimeter (periphery) of media pack 216, adjacent inlet end 222 and over the joint 260; the region 261 being integral with the remainder of seal arrangement 236.

Although alternatives are possible, for the housing seal, region 236 defines an outer perimeter 235 configured to form a radial seal when inserted into housing 201 in the general direction indicated by arrow 270, FIG. 6. Such a seal is sometimes characterized as an "outside radial seal" or by similar terms, since seal surface 225 is directed radially outwardly. Surface 225 is configured in steps, with a smaller sized step 225a and larger sized step 225b. A cover seal is provided by region 275, which comprises an axial outer tip of seal material 236.

Although alternatives are possible, typically and preferably the seal material is molded in place on the filter cartridge 215 from a resin. A useable seal material would be a polyurethane, typically a polyurethane foam. In many preferred arrangements, the polyurethane will be selected to mold to an as molded density of no greater than 30 lbs per cubic foot (0.32 g/cc), typically no greater than 22 lbs/cu. ft (0.35 g/cc). Also it is typically chosen to have a hardness, Shore A, of no greater than 30, typically no greater than 25, usually within the range of 12-12. Although harder and more dense materials can be used, they are typically not as preferred because: they can be harder to insert if substantial interference is involved; and, they can add cost and weight.

The direction which the seal is inserted into a housing section, during use, will be generally referred to herein as the "seal insertion direction" or "normal seal insertion direction." The particular seal surface 225 of the housing seal region 236, is configured for a seal or element insertion direction toward the media pack 216, in particular toward an end 223 of media pack 216 opposite from the end 222, at which the seal region 236 is mounted. The term "normal seal direction" and variants thereof is not meant to indicate that the seal cannot be inserted oppositely, it is meant to indicate that the arrangement is designed for a particular direction of insertion, in normal and intended use.

Referring to FIG. 11, seal region 236 includes forward oblique surface 236a, annular periphery 236b and rear oblique surface 236c. The forward oblique surface 236a is longer than the rear oblique surface 236c, although alternatives are possible. In this context, "forward" and "rear" refer to insertion direction.

Figure 9:
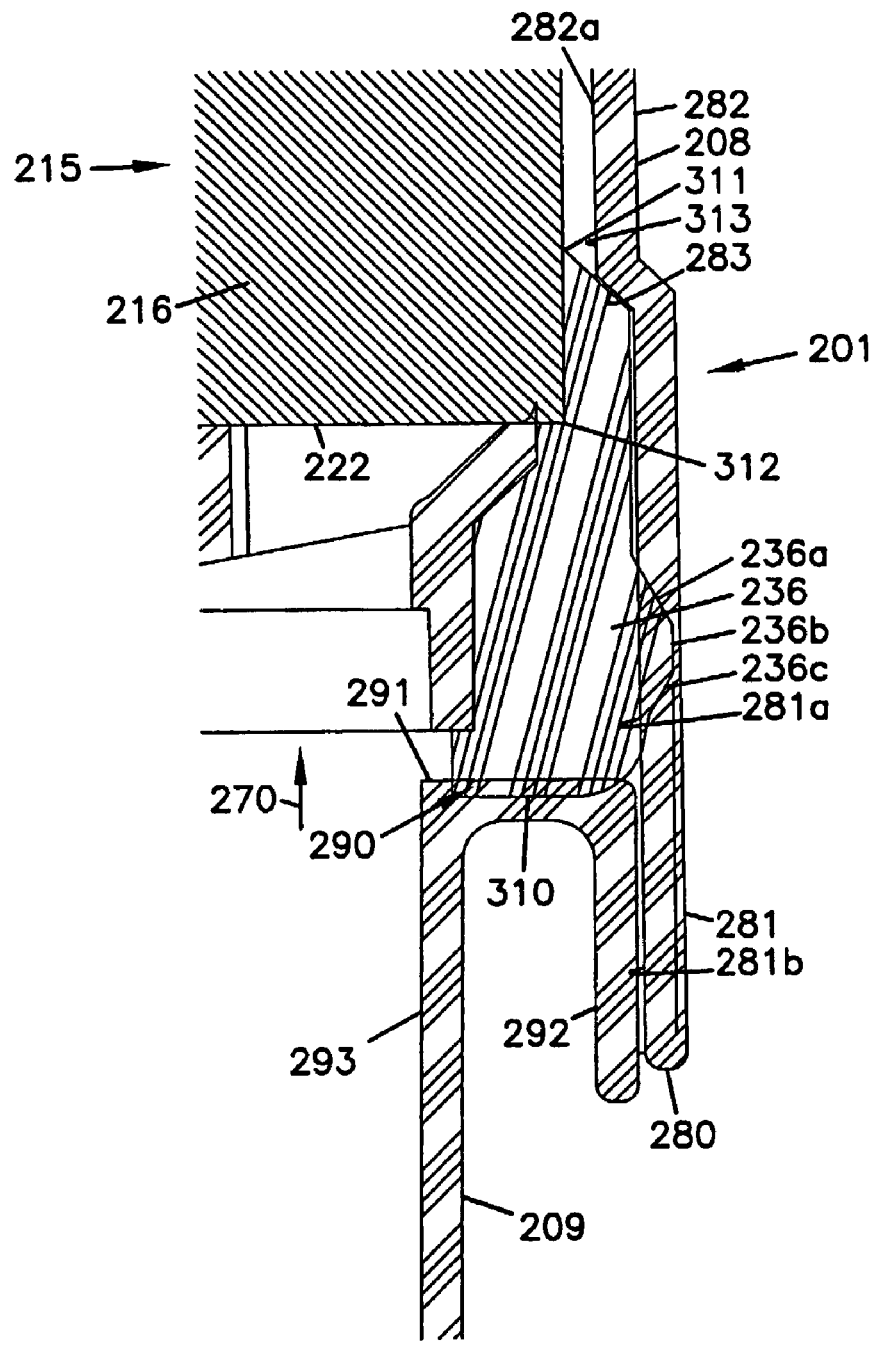
FIG. 9 is a schematic, enlarged fragmentary cross-sectional view of a portion of the arrangement depicted in FIGS. 7 and 8.

Attention is now directed to FIG. 9, which is a fragmentary cross-sectional view depicting the intersection between housing piece 208, inlet end piece 209 and seal 236 of cartridge 215. In FIG. 9, interference between portions of the seal material 236 and the housing 201 are depicted by showing overlap between the region 236 and the housing, it will be understood that in actual practice the material of seal region 236 will be deformed (for example by compression in the thickness) to conform with the relevant internal dimensions of the housing 208. Typically, the maximum compression of region 236 will be at least 1 mm, for example 1.8-2.2 mm, although alternatives are possible. Region 281b could be stepped outwardly, where the seal 236b is not located, to facilitate insertion/removal.

Referring to FIG. 9, housing 208 includes axial end 280 and a flared section 281 between end 280 and side wall portion 282. Flare 280 provides an opening into which cartridge 215 can be inserted, in the direction of arrow 270. An inside surface 281a of flare 281 will form a housing seal surface, for the filter cartridge 215. Transition section 283 between flare 281 and side wall section 282, can be used as an internal stop for seal region 236.

Based on the above, some advantages to the arrangement involving the frame piece 235 and seal arrangement 236 will be understood. In particular, as the handle arrangement 230 is manipulated, to insert and seal the filter cartridge 215 in position, and/or to remove the cartridge 215 from the orientation of FIG. 9, forces by the manipulator on the handle arrangement 230 are transferred through the framework 235 to the seal arrangement 260, without being transferred through the media pack 216. Thus, the media pack 260 moves with the handle arrangement 230, without substantial stress being transferred to the media pack 216. Of course the media pack 216 is secured at joint 260, but joint 260 is removed from the compressive forces of the seal at 225. Thus, these compressive forces are not transferred through the media pack 216. Rather they are transferred to handle arrangement 230 through support 226 and grid work 229.

The cover seal is formed between cover 209 and region 236 at 290. In particular, cover piece 209 includes end, radial, shelf 291 thereon, with outer axial extension 292 thereon; shelf 291 extending between side wall 293 and extension 292. When cover 209 is in position, it will engage seal material 236 at region 290, i.e., along axial seal surface 310, with interference being shown by overlap. Slight compression of seal region 236 axially, for example under closure force of latches, will then result in the seal.

C. The Main Filter Cartridge Receiving Section 208, FIGS. 16-19.

Attention is now directed to FIGS. 16-19, which show internal detail of housing section 208. Adjacent outlet 202 is positioned a media pack end face support arrangement 294, inner fin arrangement 295. Fin arrangement 295 includes individual fins 296. The fins 296 join at a central ring 297, FIG. 19. Thus, the fins extend between side wall 298 and ring 297. The fins 296 and ring 297, i.e., the fin arrangement 295, are configured to engage outlet end 222 of the media pack 216, as a grid, when the cartridge 215 is installed. As a result, the fin arrangement 295 will operate as a grid to support the media pack 216 against distortion under air pressure directed from inlet face 223 toward outlet face 222, during use. Herein the fins 296 and ring 297 will sometimes be collectively referenced as a "hub and fin media pack outlet end support arrangement."

Referring to FIG. 8, it is noted that the side wall 298 of the housing section 208 generally tapers inwardly in extension between region 298a and 298b, in which the media pack 216 is positioned. The inward taper will typically be a relatively small, usually less than 0.6°. Adjacent region 298b, the inner taper may be configured to be sufficiently small to engage end 216b of media pack 216, to support the media pack at this location. It is noted that point 298a is located at a junction between bell flare 281 and section 282, of the housing wall; i.e., a transition region 283 described above.

D. An Example of Air Cleaner Installation and Use.

Although alternatives are possible, the air cleaner 200 depicted is particularly well configured to fit underneath the hood of a truck, for example mounted on a frame piece, with an orientation such that service access is from underneath, i.e., in the orientation of FIG. 7. Servicing would involve removal of cover 209 downwardly, pulling of the cartridge 215 downwardly in the direction of arrow 300, FIG. 6 and then replacement. The use of an outwardly directed radial seal as described above, facilitates installation. This is because once cartridge 215 has been inserted into interior 208a of housing section 208, the seal 236 will engage the flare 281 along an interior 281a therein, and the seal compression will tend to keep the cartridge 215 in place, even before cover 209 is installed. The cover 209 can then be easily positioned and secured in place, for example by latches, screws, bolts or clips. Of course disassembly and servicing is also facilitated since once cover 209 is removed, cartridge 215 will tend to remain in place until the user grasps the handle arrangement 230 and pulls the cartridge 215 out of sealed engagement with housing section 208.

The cover seal located at 290, FIG. 9, is also convenient. The seal prevents air from entering between housing cover 209 and housing 208. Since the seal is formed from an axial region 217 integral with seal region 236, it is changed out automatically any time filter cartridge 215 is serviced. Thus an extra seal piece is avoided, and servicing is convenient. The axial region 217 can be provided in a different shape, if desired.

The housing seal 290 is particularly convenient, even though located at an upstream end 223 of the media pack 216, because underneath the hood of a truck, the environment can include contaminants that is preferred not to have enter the air cleaner 201.

Figure 20:
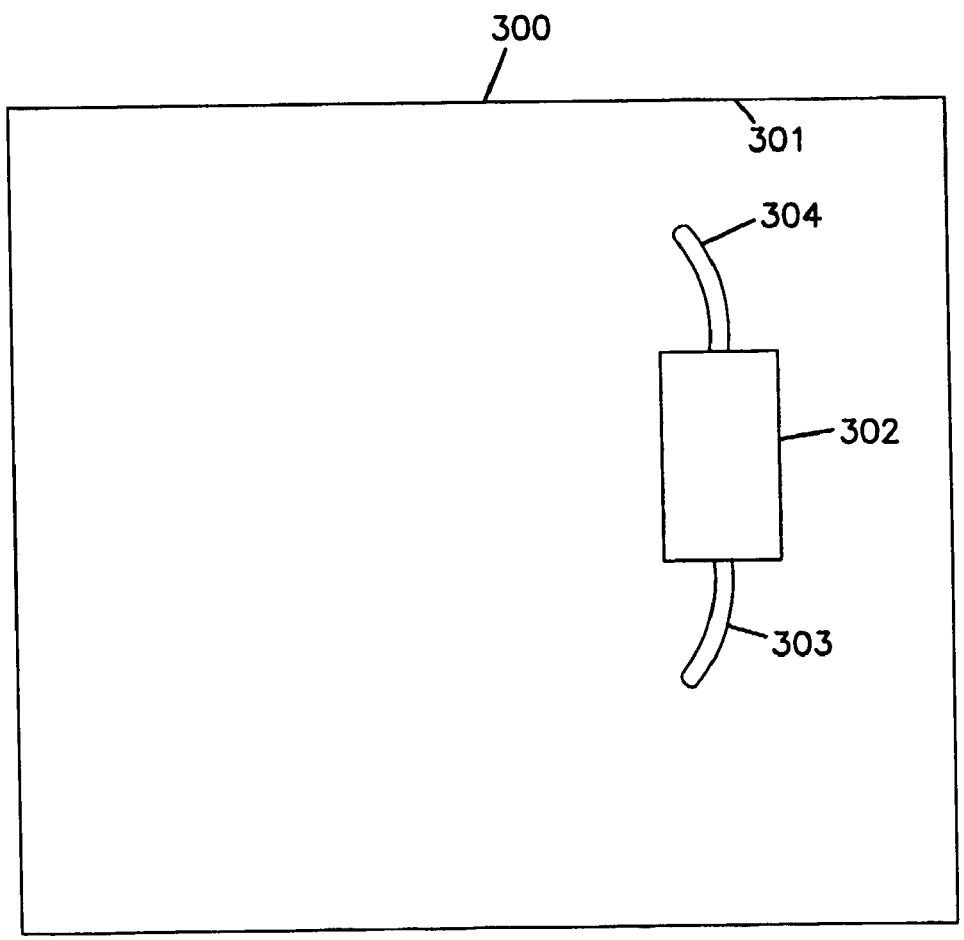
FIG. 20 is a schematic depiction of a vehicle system including an air cleaner according to the present disclosure.

With respect to an environment and arrangement of use, attention is directed to FIG. 20. In FIG. 20 a vehicle 300 is schematically depicted. In particular region 300 can be considered to be a truck, having an internal region 301 underneath a hood or similar construction, wherein an engine and an air cleaner arrangement are mounted. The air cleaner is indicated generally at 302, with duct 303 being an inlet duct for air flow into the air cleaner 302 and duct 304 being an air flow duct for filtered air from the air cleaner 302 being directed to downstream equipment and eventually in engine intake.

The air cleaner 302 depicted may be generally in accord with the descriptions above for FIGS. 6-19.

E. An Example Air Cleaner Assembly, FIGS. 21-26

Figure 21:
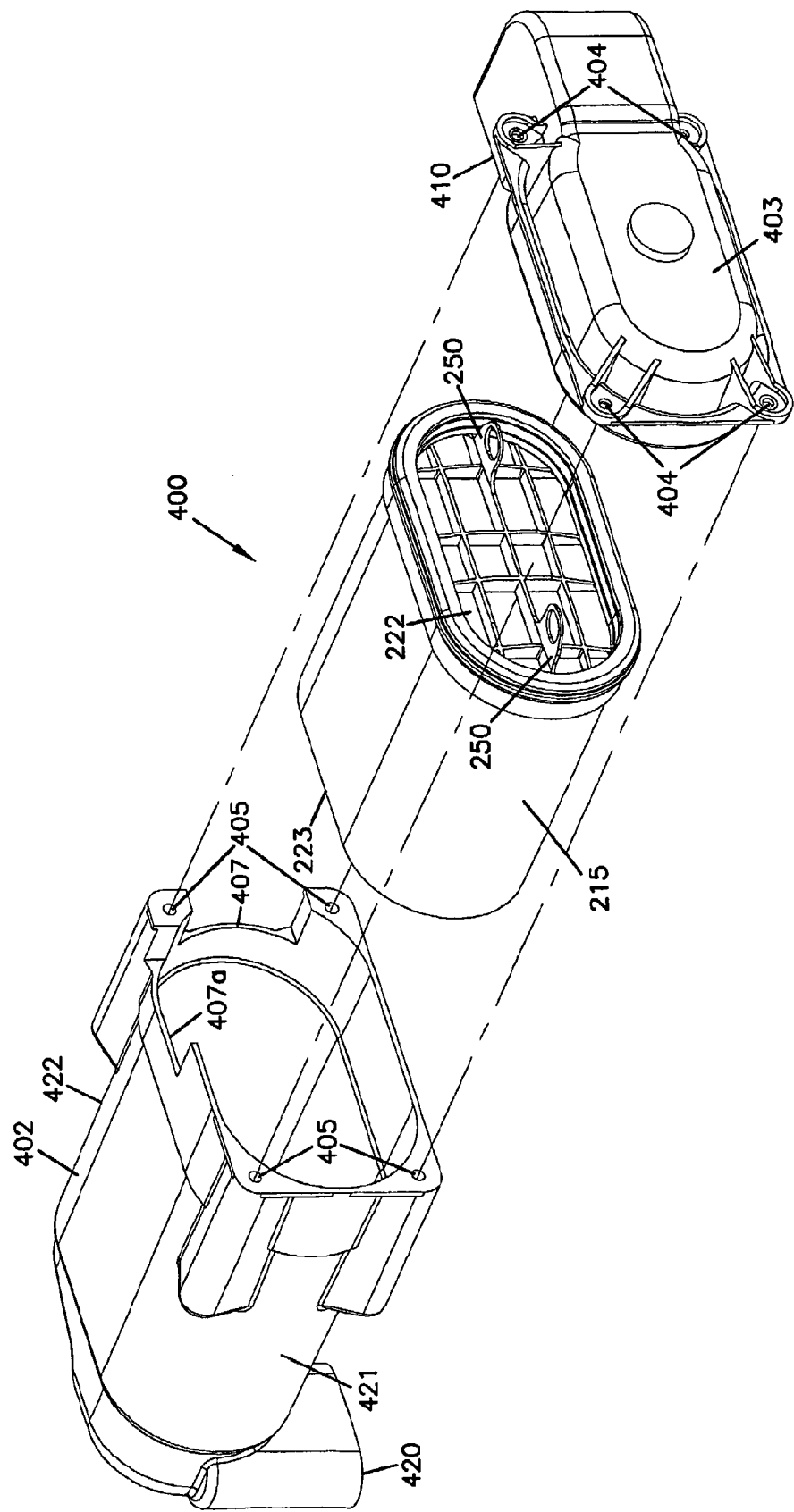
FIG. 21 is an exploded, schematic, depiction of a second air cleaner assembly including a filter cartridge according to FIGS. 10 and 11 therein.

Reference numeral 400, FIG. 21, depicts an air cleaner assembly according to the present disclosure. The air cleaner 400 includes a filter cartridge 215 generally as described above.

Figure 22:
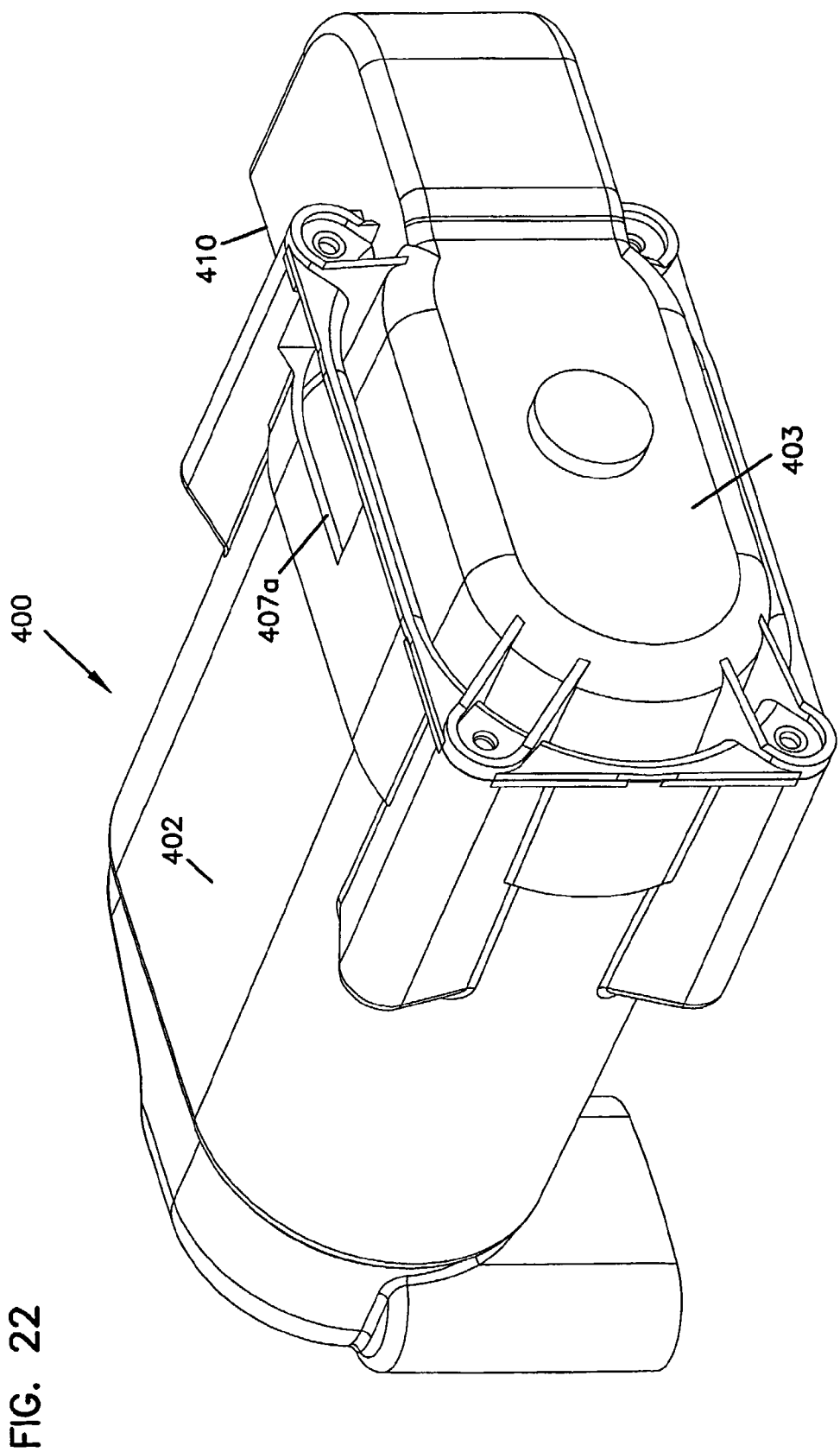
FIG. 22 is a depiction of the air cleaner of FIG. 21, in an non-exploded view.

Air cleaner 400 includes housing section 402 and cover 403. The cover 403 includes bolt hole extensions 404 which, in use, align with bolt receivers 405 on section 402. In use, when assembled, bolts can be projected through components 404, 405, to secure cover 403 on housing section 402. In FIG. 22, air cleaner 400 is shown with cover 403 on housing section 402.

Referring to FIG. 22, at 410 an air flow inlet is shown. The air flow inlet 410 is configured to direct air into the interior of air cleaner 400, in a side direction as opposed to in an axial direction. Referring to FIG. 21, it is convenient that handles 250 are positioned with a narrow dimension directed along the path of side air flow, so as not to restrict the air flow or inhibit the air flow in an undesirable manner.

Referring to FIG. 21, housing section 402 includes at end 406 notch 407. The notch 407 is positioned to receive a projection or portion of inlet 410 therein, when the air cleaner 400 is assembled, FIG. 22. The housing section 402 includes a second notch 407a positioned to accommodate an alternate inlet cover. This provides for a more universal applicability of section 402.

Figure 23:
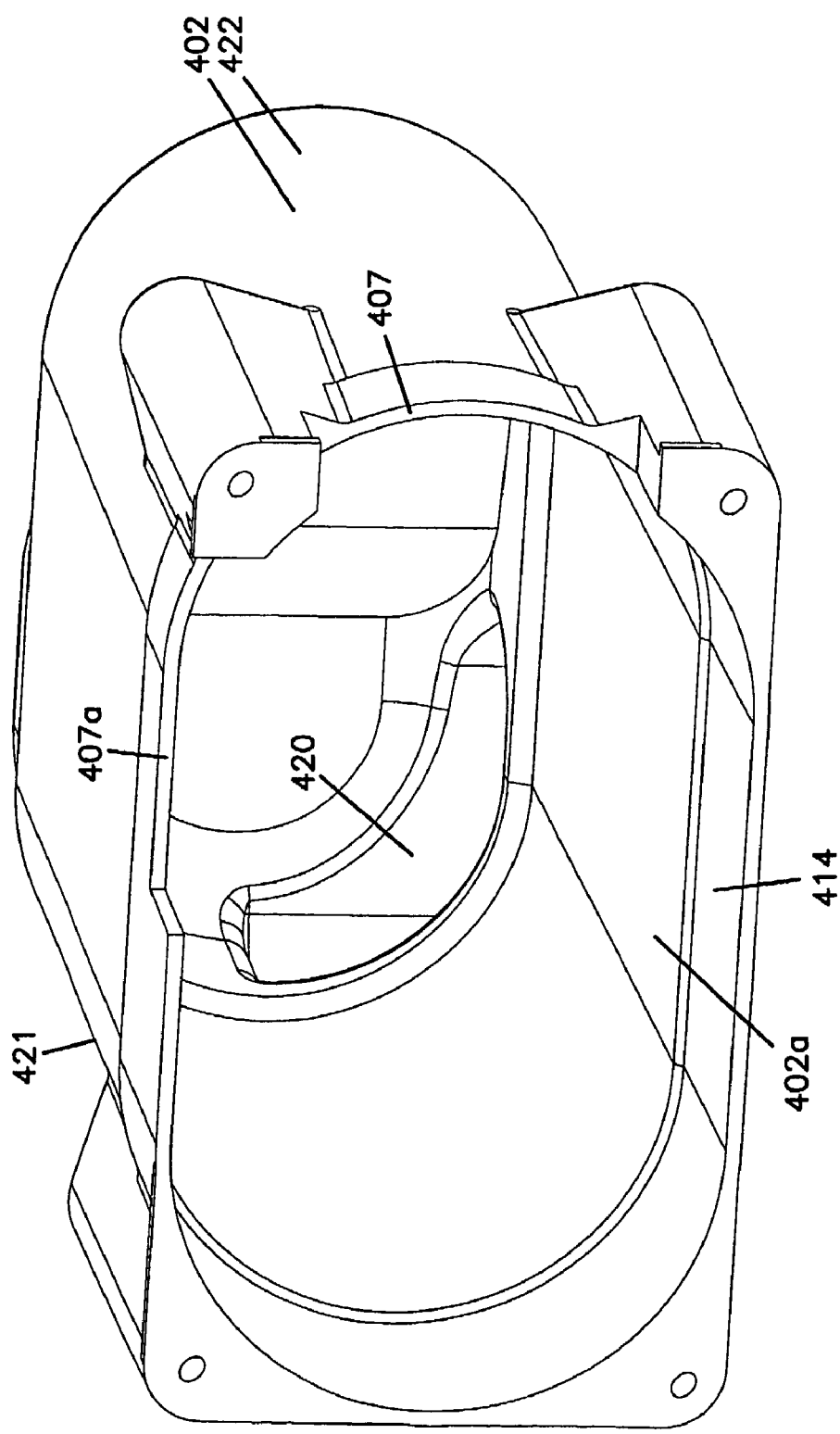
FIG. 23 is a perspective view directed toward an inside of a housing component of the air cleaner of FIG. 21.
Figure 24:
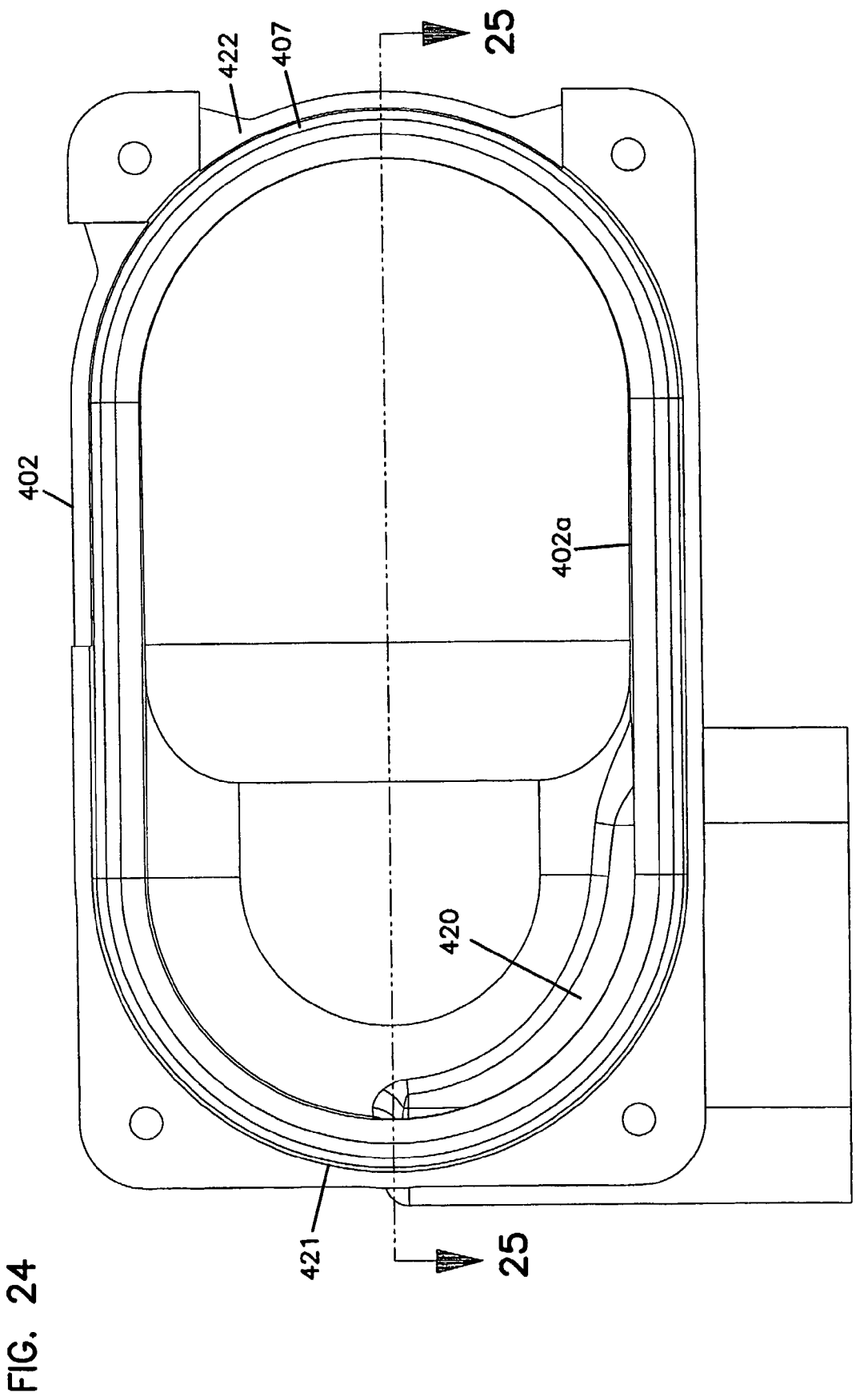
FIG. 24 is a plan view directed toward the inside of the component of FIG. 23.

In FIG. 23, housing section 402 is depicted. In particular, the interior 402a of the housing section 402 can be viewed, with region 414 being located where a housing seal would form, when cartridge 215 is installed. It is noted that section 402 has a side air flow outlet 420, on a curved opposite side 421 of the housing 402 from the curved side 422, FIG. 21, that has cut out or notch 407 aligned with part of the cover 403 that forms inlet 410. In FIG. 24, section 402 is viewed in plane view. It is noted that section 402 does not include a grid work extending there across, to support the filter cartridge 215, FIG. 21, at the downstream end 223. However, a grid work could be provided, if desired.

Figure 25:
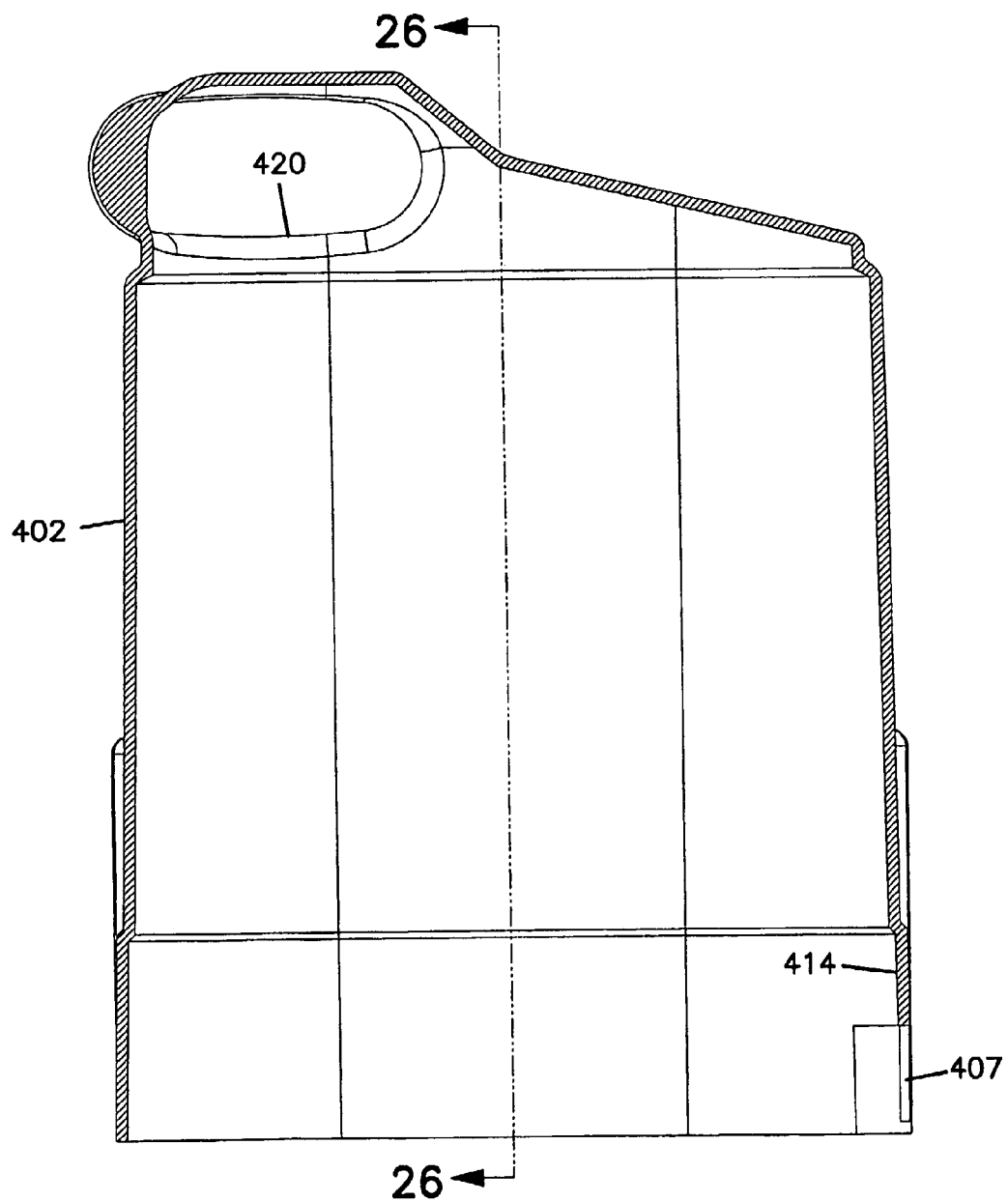
FIG. 25 is a cross-sectional view taken generally along line 25-25, FIG. 24.

In FIG. 25, a cross-sectional view is depicted, showing outlet 420.

Figure 26:
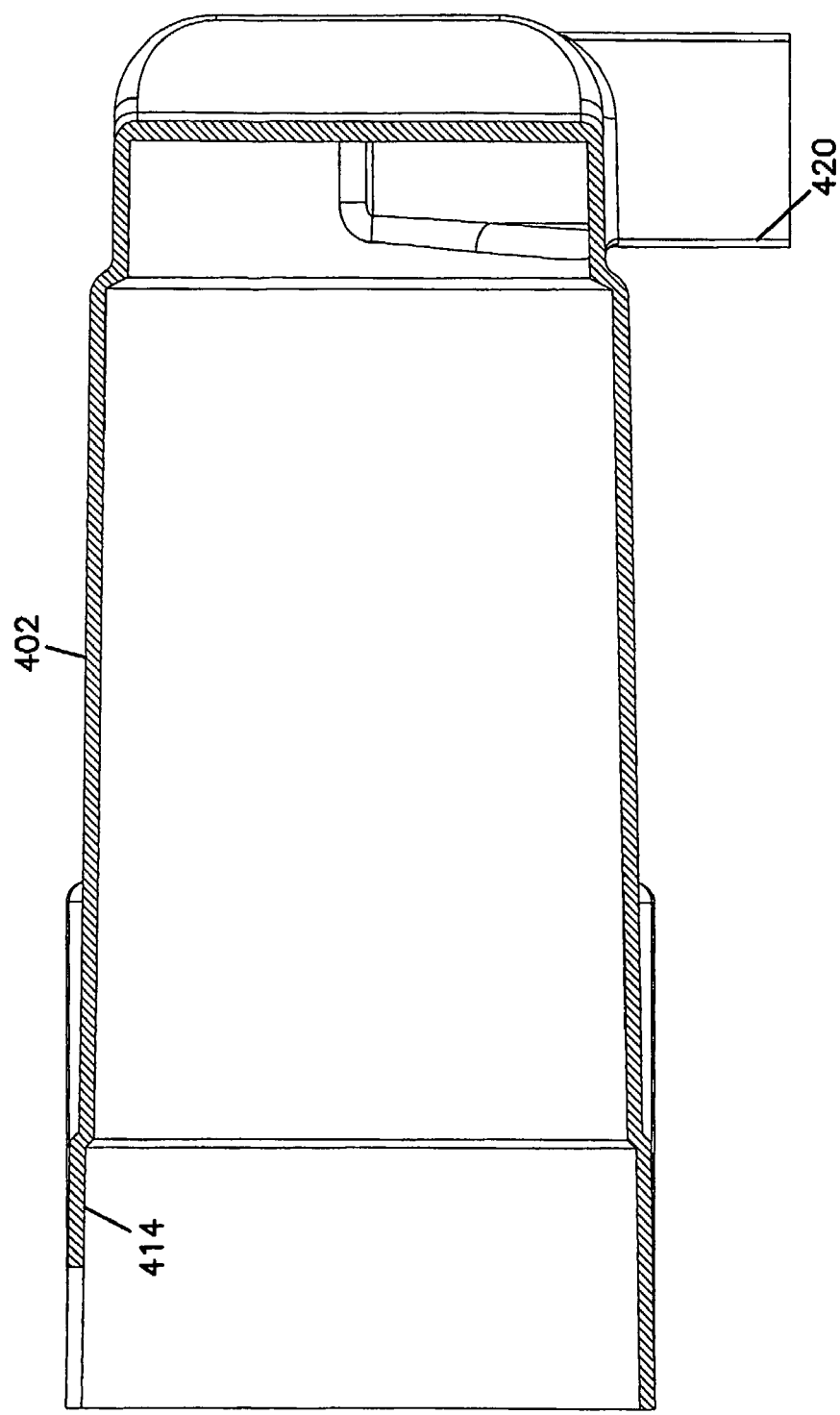
FIG. 26 is a cross-sectional view taken generally along line 26-26, FIG. 25.

In FIG. 26 a cross-sectional view is depicted, showing outlet 420 from a different orientation.

Referring to FIG. 21, it is noted that inlet section 403 is configured for a "u" shaped inlet flow path. That is, air enters inlet 410, turns to extend across end face 222 of cartridge 215, and then extends through the cartridge 215 toward an outlet end 420 of housing section 402. Alternate inlet configurations from a "u" shape are possible.

Still referring to FIG. 21, it is noted that outlet 420 is a "L" shaped outlet. That is, air as it exits the housing section 402 it generally goes through turns moving in at an "L" shape, to exit housing section 402. Although alternatives are possible, this is a convenient configuration. Of course outlet 420 could be directed in an alternate direction.

F. Some Example Dimensions.

The air cleaner arrangement 201 can be provided in a variety of sizes and configurations. The example configuration depicted, is meant to be demonstrative of the principles and also to show a particularly convenient arrangement for insertion.

For the particular arrangement depicted in the figures, the following dimensions will provide an indication of a working example:

1. Length dimension between point 203*a* on inlet 203 and point 202*a* on outlet 202, FIG. 8—392.6 mm;
2. Axial length of media pack—200 mm;
3. Longer width dimension of media pack—216 mm;
4. Shorter width dimension of media pack—114 mm;
5. Longest outside perimeter width of seal material in uncompressed configuration—228.9 mm;
6. Longest outside perimeter width of seal material in shorter width direction—126.9 mm;
7. Longest inside dimension of flare 281—227.7 mm, allowing for a total of 1.2 mm interference, or 0.6 mm of interference around an interior of flare 281, between seal 236 and housing 201;
8. Total axial length of seal material 236 between tip 310 and end point 311, FIG. 11,—34 mm;
9. Axial length between point 311 and point 312, FIG. 9,—10.8 mm;
10. Gap between media pack 216 and interior 282*a* at point 313, FIG. 9—2.1 mm;
11. Housing side wall thickness 1.9 mm.

Other dimensions can be derived from the figures, using the above dimensions as a guide.

What is claimed is:

1. An air filter cartridge comprising:
   (a) a media pack comprising filter media formed from corrugated media secured to facing media;
      (i) the media pack having opposite ends defining inlet and outlet flow faces with a plurality of inlet flutes and outlet flutes extending between the inlet and outlet flow faces;
   (b) a framework arrangement comprising a molded plastic piece secured to a first end of the media pack; the framework arrangement including:
      (i) gridwork extending across the inlet flow face at the first end of the media pack;
      (ii) a handle portion on the gridwork projecting axially outwardly away from the inlet flow face at the first end of the media pack, and in overlap with the media pack; and,
      (iii) a housing seal support secured to the framework in a position at the same end of the media pack as the handle portion; and,
      (iv) structure transferring handling forces from the handle portion to the housing seal support, without passage through the media pack; and,
   (c) a seal arrangement positioned on the framework arrangement in overlap with the housing seal support and including a housing seal portion;
      (i) the housing seal portion including a portion configured to form an outside radial seal.

2. An air filter cartridge according to claim 1 wherein:
   (a) the seal arrangement comprises molded in place polymeric material.

3. An air filter cartridge according to claim 1 wherein:
   (a) the housing seal support includes an axial section and a flared section; the flared section being positioned adjacent the media pack with the axial projection extending outwardly therefrom.

4. An air filter cartridge according to claim 1 wherein:
   (a) a portion of the seal arrangement includes a section sealing a joint between the media pack and the framework arrangement.

5. An air filter cartridge according to claim 1 wherein:
   (a) the seal arrangement comprises polyurethane.

6. An air filter cartridge according to claim 1 wherein:
   (a) the media pack comprises a coiled strip of corrugated sheet secured to facing sheet.

7. An air filter cartridge according to claim 6 wherein:
   (a) the media pack has an oval cross-section.

8. An air filter cartridge according to claim 7 wherein:
   (a) the media pack has a racetrack cross-section with a pair of opposite straight sides and a pair of opposite curved ends.

9. An air filter cartridge according to claim 8 wherein:
   (a) the housing seal portion of the seal arrangement has an oval shape.

10. An air filter cartridge according to claim 9 wherein:
    (a) the housing seal portion has two, opposite, straight sides and two, opposite, curved ends.

11. An air filter cartridge according to claim 1 wherein:
    (a) the housing seal portion is configured with a normal seal insertion direction oriented toward an end of the media pack remote from the framework arrangement.

12. An air cleaner arrangement including:
    (a) a housing having a first filter cartridge receiving section and a second, cover section; the housing defining an interior;
    (b) a filter cartridge removably positioned within the housing interior; the filter cartridge comprising:
       (i) a media pack comprising filter media formed from corrugated media secured to facing media;
          (A) the media pack having opposite ends defining inlet and outlet flow faces with a plurality of inlet flutes and outlet flutes extending between the inlet and outlet flow faces;
       (ii) a framework arrangement comprising a molded plastic piece secured to a first end of the media pack; the framework arrangement including:
          (A) gridwork extending across the inlet flow face at the first end of the media pack;
          (B) a handle portion on the gridwork projecting axially outwardly away from the inlet flow face at the first end of the media pack, and in overlap with the media pack;
          (C) a housing seal support secured to the framework in a position at the same end of the media pack as the handle portion; and,
          (D) structure transferring handling forces from the handle portion to the housing seal support, without passage through the media pack; and,
       (iii) a seal arrangement positioned on the framework arrangement in overlap with the housing seal support and including a housing seal portion;
          (A) the housing seal portion providing an outside radial seal.

13. An air cleaner arrangement according to claim 12 wherein:
(a) the filter cartridge receiving section has an air outlet therein;
(b) the cover section has an air inlet therein.

14. An air cleaner arrangement according to claim 13 wherein:
(a) the housing seal portion is configured with a normal seal insertion direction oriented toward an end of the media pack remote from the framework arrangement;
(b) the seal arrangement includes an outer, axial, cover seal region; and,
(c) the cover section includes a surface pressed against the outer, axial, cover seal region.

15. An air cleaner arrangement according to claim 14 wherein:
(a) the first section of the housing includes a side wall having an open end with a flared section thereat;
  (i) the flared section defining a housing seal surface; and,
(b) the filter cartridge is positioned within the housing with the housing seal arrangement radially sealed against the housing seal surface.

16. An air cleaner arrangement according to claim 15 wherein:
(a) the air outlet is an axial air outlet and the air inlet is an axial air inlet.

17. An assembly comprising:
(a) a vehicle having an engine compartment; and,
(b) an air cleaner positioned within the engine compartment;
  (i) the air cleaner including a housing having a first filter cartridge receiving section and a second cover section; the housing defining an interior;
    (A) the housing including an air inlet and on air outlet;
  (ii) a filter cartridge positioned within the housing interior; the filter cartridge comprising:
    (A) a media pack comprising filter media formed from corrugated media secured to facing media;
      (1) the media pack having opposite ends defining inlet and outlet flow faces with a plurality of inlet flutes and outlet flutes extending between the inlet and outlet flow faces;
    (B) a framework arrangement comprising a molded plastic piece secured to a first end of the media pack; the framework arrangement including:
      (1) a gridwork extending across the inlet flow face at the first end of the media pack;
      (2) a handle portion on the gridwork projecting axially outwardly away from the inlet face flow face at the first end of the media pack, and in overlap with the media pack;
      (3) a housing seal support secured to the framework in a position at the same end of the media pack as the handle portion; and,
      (4) structure transferring handling forces from the handle portion to the housing seal support, without passage through the media pack; and,
    (C) a seal arrangement positioned on the framework arrangement in overlap with the housing seal support and including a housing seal portion;
      (1) the housing seal portion including a portion configured to form an outside radial seal;
    (D) the seal arrangement being removably sealed to the housing; and,
    (E) the cartridge being positioned in the housing with the media pack inlet flow face below the media pack outlet flow face.

18. A method of installing a filter cartridge in an air cleaner housing:
(a) the housing including a first housing section positioned with an air flow outlet end positioned above an air flow inlet end;
(b) the method including steps of:
  (i) positioning a filter cartridge within the first housing section; the filter cartridge comprising:
    (A) the housing including an air inlet and on air outlet;
      (1) the media pack having opposite ends defining inlet and outlet flow faces with a plurality of inlet flutes and outlet flutes extending between the inlet and outlet flow faces;
    (B) a framework arrangement comprising a molded plastic piece secured to a first end of the media pack; the framework arrangement including:
      (1) gridwork extending across the inlet flow face at the first end of the media pack;
      (2) a handle portion on the gridwork projecting axially outwardly away from the inlet flow face at the first end of the media pack, and in overlap with the media pack;
      (3) a housing seal support secured to the framework in a position at a same end of the media pack as the handle portion; and,
      (4) structure transferring handling forces from the handle portion to the housing seal support, without passage through the media pack; and,
    (C) a seal arrangement positioned on the framework arrangement in overlap with the housing seal support and including a housing seal portion;
      (1) the housing seal portion including a portion configured to form an outside radial seal;
    (D) the media pack being positioned with the outlet flow face above the inlet flow face; and,
  (ii) positioning a housing cover section to close a housing first section lower open end.

* * * * *